(12) United States Patent
Bisher, Jr. et al.

(10) Patent No.: US 7,627,887 B2
(45) Date of Patent: Dec. 1, 2009

(54) SYSTEM AND METHOD FOR MULTICASTING PACKETS IN A SUBSCRIBER NETWORK

(75) Inventors: James A. Bisher, Jr., Lawrenceville, GA (US); Neil B. Buchen, Sugar Hill, GA (US); Thomas C. Wilson, Duluth, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 1150 days.

(21) Appl. No.: 09/845,510

(22) Filed: Apr. 30, 2001

(65) Prior Publication Data
US 2002/0162114 A1    Oct. 31, 2002

(51) Int. Cl.
*H04N 7/173* (2006.01)
(52) U.S. Cl. .................. 725/91; 725/114; 725/138; 709/203; 370/401
(58) Field of Classification Search ........... 725/86–119; 709/117–231; 370/401–487
See application file for complete search history.

(56) References Cited

U.S. PATENT DOCUMENTS

| | | | | |
|---|---|---|---|---|
| 5,629,732 | A * | 5/1997 | Moskowitz et al. ......... | 725/102 |
| 5,819,036 | A * | 10/1998 | Adams et al. .............. | 709/203 |
| 5,847,751 | A * | 12/1998 | Safadi ....................... | 725/119 |
| 5,898,687 | A * | 4/1999 | Harriman et al. ........... | 370/390 |
| 5,983,005 | A * | 11/1999 | Monteiro et al. ........... | 709/231 |
| 6,088,346 | A * | 7/2000 | Du et al. .................... | 370/338 |
| 6,212,182 | B1 * | 4/2001 | McKeown .................. | 370/390 |
| 6,305,019 | B1 * | 10/2001 | Dyer et al. .................. | 725/91 |
| 6,378,130 | B1 * | 4/2002 | Adams ....................... | 725/95 |
| 6,515,991 | B1 * | 2/2003 | McKeown .................. | 370/390 |
| 6,598,229 | B2 * | 7/2003 | Smyth et al. ............... | 725/107 |
| 6,738,983 | B1 * | 5/2004 | Rao et al. ................... | 725/120 |
| 6,771,642 | B1 * | 8/2004 | Seaver et al. ............... | 370/360 |
| 6,909,715 | B1 * | 6/2005 | Denney et al. ............. | 370/392 |
| 6,917,614 | B1 * | 7/2005 | Laubach et al. ............ | 370/392 |
| 7,027,733 | B2 * | 4/2006 | Feuer et al. ................ | 398/72 |
| 7,107,606 | B2 * | 9/2006 | Lee ............................ | 725/87 |
| 7,203,201 | B2 * | 4/2007 | Son et al. ................... | 370/401 |
| 7,366,417 | B2 * | 4/2008 | Feuer et al. ................ | 398/72 |
| 2001/0030975 | A1 * | 10/2001 | Limb et al. ................ | 370/465 |

* cited by examiner

*Primary Examiner*—Annan Q Shang
(74) *Attorney, Agent, or Firm*—Tarolli, Sundheim, Covell & Tummino LLP

(57) ABSTRACT

An apparatus in a digital network receives digital packets, such as MPEG packets, included in at least one input transport stream and outputs a plurality of modulated output transport streams. The apparatus determines whether the input transport streams include packets that are for multicasting from a plurality of the modulators included within the apparatus. The apparatus also determines whether the input transport streams include unicast packets that are transmitted from only one of the output modulators of the apparatus. The apparatus identifies the unicast and multicast packets of the input transport streams and associates a modulator for each unicast packet. The associated modulator of a unicast packet is the particular modulator from which the packet is modulated and transmitted. The apparatus also associates a plurality of modulators with each multicast packet, wherein the associated plurality of modulators are the modulators from which the multicast packet is transmitted.

51 Claims, 10 Drawing Sheets

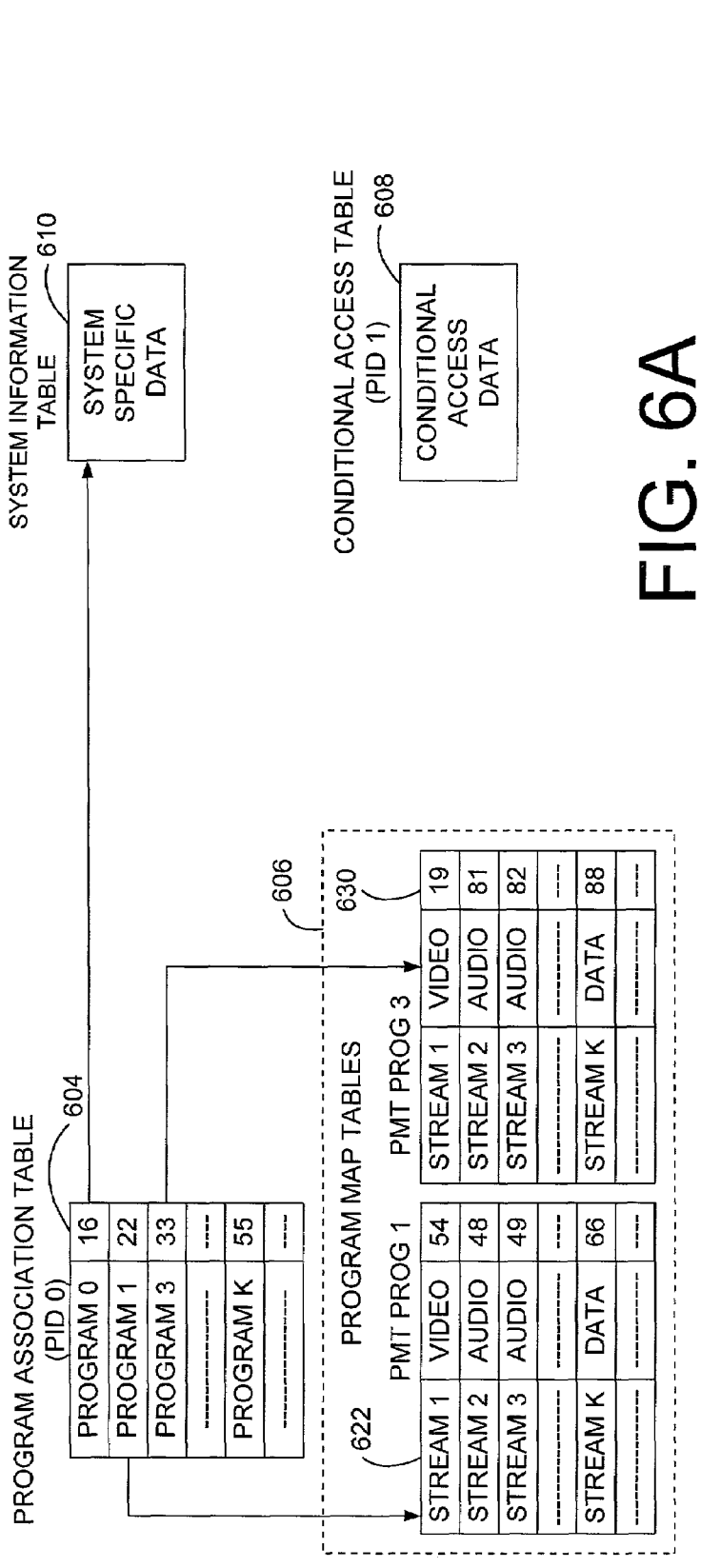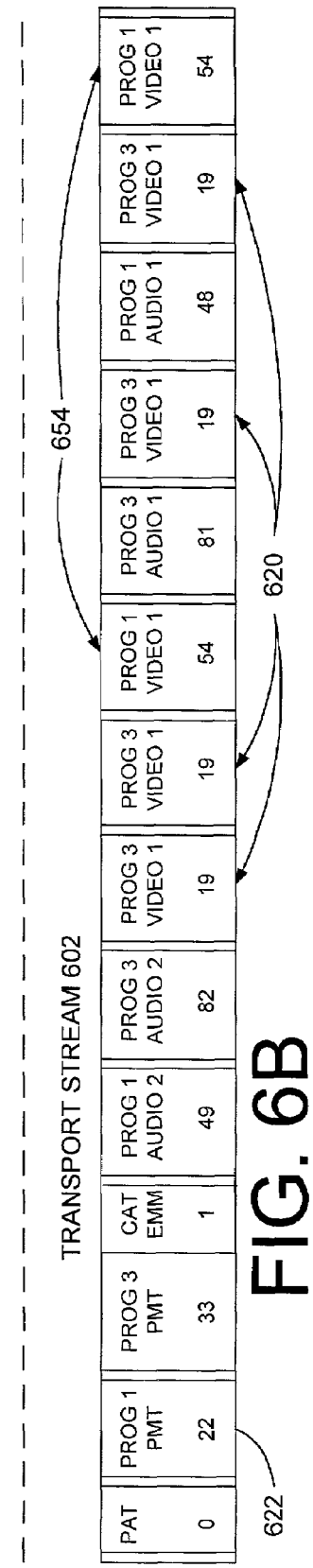
FIG. 6A
FIG. 6B

US 7,627,887 B2

SYSTEM AND METHOD FOR MULTICASTING PACKETS IN A SUBSCRIBER NETWORK

FIELD OF THE INVENTION

This invention relates generally to broadband communications systems, such as cable television systems and the equipment of the digital headend and hubs within such systems, and more specifically to multicasting digital packets within the broadband communication system.

BACKGROUND OF THE INVENTION

Frequently, broadband systems transmit television signals to subscribers of a conditional access system. Broadband systems, such as cable and satellite television systems, typically include a headend for receiving programming, or sessions, and/or services from various sources and redistributing the programming and/or services through a distribution system to subscribers. The headend receives programming signals from a variety of sources, combines the programming signals from the various sources, and transmits the combined signals through the distribution system to subscriber equipment. The distribution system can include a variety of media, such as coaxial cable, fiber optic cable, and satellite links, as well as a network of distributed nodes that then transmit the programming to subscriber locations, or to a network of distributed hubs, which transmit the signals to subscriber equipment, or any combination thereof. In a cable television system, the subscriber equipment can include a cable-ready television, a cable-ready video cassette recorder (VCR), or a digital home communications terminal (DHCT) that is connected to a television, computer, or other display device.

The headend uses modulators to control the streams of data into the distribution system. In today's competitive market, the modulators must be able to accept data/programming from equipment manufactured by many different suppliers. Increasingly, the headend is receiving and transmitting programming in a digital, for example, Moving Pictures Expert Group (MPEG) format, instead of an analog format. Transmitting programs in MPEG format is advantageous because multiple digitized programs can be combined and transmitted in the same 6 MHz of bandwidth that is required to transmit a single analog channel or program.

MPEG transport streams include overhead information such as MPEG tables that indicate the types and location of the programming within the transport stream. In a local television system, the MPEG tables include information that is specific to that local distribution system and its particular channel line-up. MPEG as referenced in this application is described in the MPEG-1 and MPEG-2 standards. The MPEG-1 standards (ISO/IEC 11172) and the MPEG-2 standards (ISO/IEC 13818) are described in detail in the International Organization for Standardization document ISO/IEC JTC1/SC29/WG11 N (June 1996 for MPEG-1 and July 1996 for MPEG-2), which is hereby incorporated by reference. Therefore, the headend system, and the modulators in particular, must add the required MPEG table data to the outgoing bit stream.

Content and data providers provide streams of data, data streams, that include video, audio and data, to cable operators via video sources, such as video encoders and video servers. The data streams are initially prepared for transmission through the broadband system by programming, or mapping, the video, audio and data with control software within a digital network control system (DNCS), which is an element manager for processing data within the headend. The DNCS causes the data streams associated with several programs to be combined into bundled groups of sessions. More specifically, the cable operator defines and maps the specifications of the individual data streams from one or several content and data providers and, for example, multiplexes them into grouped sessions in order to maximize the use of the bandwidth available within the cable television system.

In any broadband system there is a limited amount of bandwidth available. For example, a typical cable television system has a forward bandwidth of 50 Megahertz (MHz) to 870 MHz, which is divided into channels. Therefore, a limited number of modulated channels that can be delivered to a particular DHCT. An example of a modulator is a quadrature amplitude modulation (QAM) modulator that receives a digital bit stream and modulates it for transmission over the cable network. Typically, a channel occupies 6 MHz of bandwidth, and a QAM modulator can generally modulate and transmit data through the bandwidth at a rate of approximately 27 to 38 bits per second depending upon the model of the QAM modulator used. In a typical broadband cable environment, the bandwidth limitation determines the number of services, such as video-on-demand (VOD) and the number of channel offerings that a cable operator may offer its customers.

The modulator modulates the bundled group of sessions with a particular radio frequency (RF), and the modulated signal is provided to the output port of the modulator. A combiner then combines the modulated sessions with other outputs from modulators. The combined modulated outputs are then provided downstream via the distribution network to a plurality of DHCTs. There are numerous bundled groups of sessions that can be programmed by the DNCS and provided to numerous modulators; however, each bundled group is modulated with a different frequency across all the modulators.

BRIEF DESCRIPTION OF THE DRAWINGS

FIG. 6, consisting of FIG. 6A and FIG. 6B, illustrates the relationship between MPEG tables and an MPEG transport stream.

DETAILED DESCRIPTION OF A PREFERRED EMBODIMENT

The preferred embodiment of the invention is directed to a method and a multimodulator that receives a plurality of transport streams of digital packets and modulates and transmits the packets associated with a given program, which is included in one of the input transport streams, through a plurality of modulators. Although the transport streams of the preferred embodiment of the invention are described in terms of MPEG transport streams, it is to be understood that this is for exemplary purposes only, and that the preferred embodiment of the invention is not limited to MPEG transport streams. Furthermore, the modulators of the preferred embodiment of the invention are described in terms of radio frequency modulators, such as, but not limited to QAM modulators, and again, it is to be understood that this is a non-limiting example of a modulator. Accordingly, other conventional transport stream and modulation techniques are included in the scope of the present invention.

The preferred embodiment of the invention will be described more fully hereinafter with reference to the accompanying drawings in which like numerals represent like elements throughout the several figures, and in which an exemplary embodiment of the invention is shown. This invention may, however, be embodied in many different forms and should not be construed as limited to the embodiments set forth herein; rather, the embodiments are provided so that this disclosure will be thorough and complete, and will fully convey the scope of the invention to those skilled in the art. All examples are intended to be non-limiting, with additional examples being included within the scope of the present invention.

Television System Overview

The preferred embodiment of the invention is best understood within the context of a two-way, interactive digital subscriber television system, as an example. In this discussion, the two-way interactive digital subscriber television system is also referred to as a Digital Broadband Delivery System (DBDS). An overview of an exemplary DBDS is provided in U.S. Pat. No. 6,157,719, entitled "Conditional Access System", which is hereby incorporated by reference herein in its entirety. The function of the DBDS is to provide interfaces to content providers, entitlement agents, and services, control access to and the use of the content and services, and to distribute the content and services to subscribers. The DBDS uses Motion Picture Experts Group (MPEG) transport streams for delivery of video, audio, and data entertainment services. These can include, among others, programming and services such as local television channels, premium movie channels, video-on-demand (VOD), telephone services, and Internet access.

Figure 1:
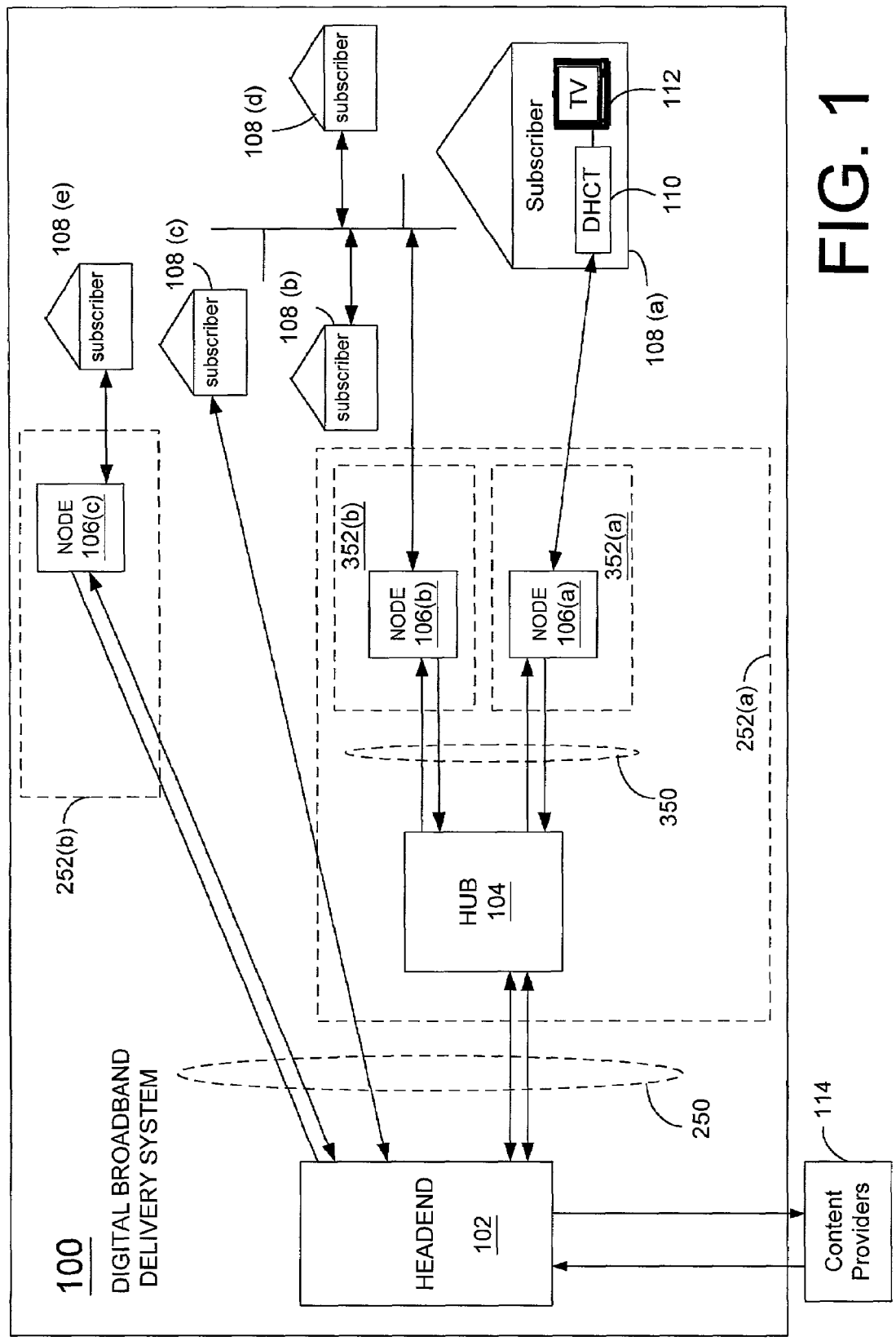
FIG. 1 is a broadband communications system, such as a cable television system, in which the preferred embodiment of the invention may be employed.

Referring now to FIG. 1, a digital broadband distribution system (DBDS) 100 includes a headend 102, a hub 104, multiple nodes 106, a plurality of subscriber locations 108, and a plurality of digital home communication terminals (DHCTs) 110. The headend 102 provides the interface between the DBDS 100 and service and content providers 114, such as broadcasters, Internet service providers, and the like. The transmission medium between the headend 102 and the service and content providers 114 can be two-way. This allows for two-way interactive services such as Internet access via DBDS 100.

Unlike the transmission medium of prior systems, which have a main trunk and branches, the DBDS includes a plurality of distribution systems 252 that are in communication with the headend 102 via transmission medium 250. The distribution systems 252 include direct transmission from the headend 102 to subscriber locations 108 and indirect transmission from the headend 102 to the subscriber locations 108. Indirect transmission from the headend 102 includes distribution systems 252(a) and 252(b). Distribution system 252(a) includes hub 104 and a plurality of nodes 106. The hub 104 receives programming and other information from headend 102 via transmission medium 250 and transmits information via transmission medium 350 to distribution systems 352, which include nodes 106 that transmit information to subscriber locations 108 and receive information therefrom. Distribution system 252(b) includes nodes 106 that are in direct communication with headend 102 and direct communication with subscriber locations 108. In the preferred embodiment, the subscriber locations 108 are in two-way communication with the headend 102 or a hub 104 or a node 106. Typically the transmission medium 250 and the transmission medium 350 are optical fibers that allow the distribution of high quality and high speed signals. The DBDS 100 can use broadband coaxial cable to distribute the signal within the sub-region. The headend 102 can also provide service to its immediate sub-region. For example, service and programming for the subscriber location 108(c) are sent directly to the subscriber location 108(c) from the headend 102.

The hub 104 can also function as a mini-headend for the introduction of programming and services to each sub-region, or distribution system 352, connected to the hub 104. This facilitates the introduction of different services and programming to different sub-regions within the DBDS 100. For example, the subscriber location 108(b), which is connected to node 106(b), can have different services and programming available than the services and programming available to subscriber location 108(c), which is connected directly to headend 102, even though the subscriber locations 108(b) and 108(c) may be in close physical proximity to each other. Service and programming for subscriber location 108(b) are routed through hub 104 and node 106(b), and hub 104 can introduce services and programming into the DBDS 100 that are not available through the headend 102.

At the subscriber locations 108 a decoder or a DHCT 110 provides the two-way interface between the DBDS 100 and the subscriber. The DHCT decodes the signals for display on a display device, such as a television set (TV) 112 or a computer monitor. Those skilled in the art will appreciate that in alternative embodiments the equipment for decoding the signal can be located in a variety of equipment, including, but not limited to, a DHCT, a computer, a TV, a monitor, or an MPEG decoder.

Figure 2:
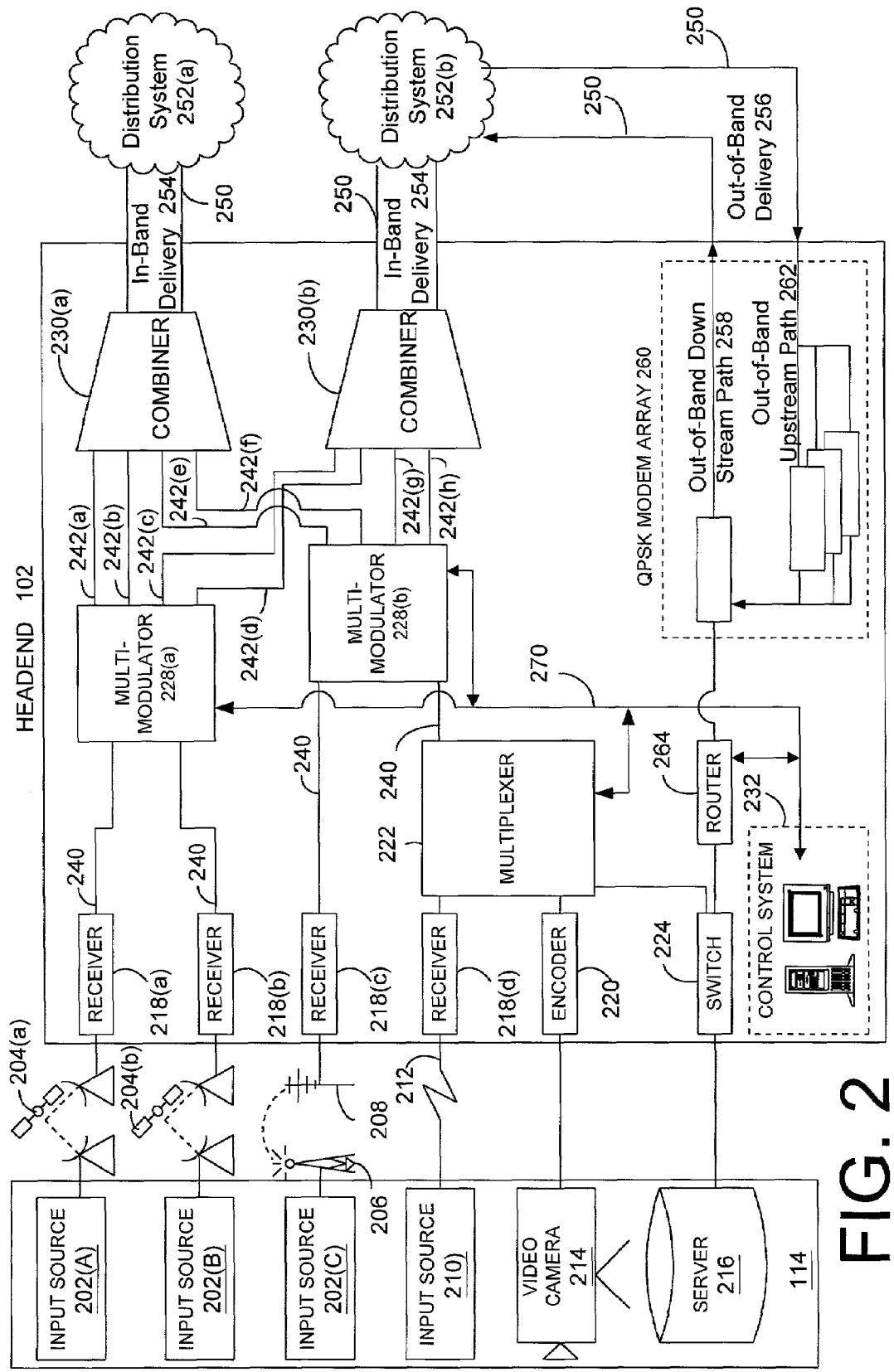
FIG. 2 is a headend in the broadband communication system in which the preferred embodiment of the invention may be employed.

FIG. 2 is an overview of a headend 102, which provides the interface between the DBDS 100 and the service and content providers 114. The headend 102 receives content from a variety of service and content providers 114, which can provide input in a variety of ways. The headend 102 combines the content from the various sources and distributes the content to subscribers via distribution systems 252.

In a typical system, the programming, services and other information from content providers 114 is received from a variety of input sources 202 and 210. The input signals may be transmitted from sources to the headend 102 via a variety of transmission paths, including satellites 204, and terrestrial broadcast transmitter and antenna, 206 and 208, respectively. The headend 102 can also receive content from a direct feed source 210 via a direct line 212. Other input sources from content providers 114 include a video camera 214 or an application server 216. The signals provided by the content or programming input sources can include a single program or a multiplex that includes several programs.

The headend 102 generally includes a plurality of receivers 218 that are each associated with a content source. MPEG encoders, such as encoder 220, are included for digitally encoding things such as local programming or a feed from video camera 214. The output signal from encoder 220 is a program stream that is input into multiplexer 222, which receives input signals from switch 224, receiver 218(D) and control system 232. The multiplexer 222 processes the input signals and multiplexes at least a portion of the input signals into transport stream 240.

The switch, such as asynchronous transfer mode (ATM) switch 224, provides an interface to an application server 216. There can be multiple application servers 216 providing a variety of services such as a Pay-Per-View service, including video on demand (VOD), a data service, an Internet service, a network system, or a telephone system. Service and content providers 114 (shown in FIG. 1) may download content to an application server 216 located within the DBDS 100. The application server 216 may be located within headend 102 or elsewhere within DBDS 100, such as in a hub 104.

The various inputs into the headend 102 are then combined with the other information from the control system 232, which is specific to the DBDS 100, such as local programming and control information, which can include among other things conditional access information. The headend 102 contains multimodulators 228 to convert the received transport streams 240 into modulated output signals suitable for transmission over the transmission medium 250 through distribution systems 252. As discussed below, each multimodulator 228 includes a plurality of modulators, such as, but not limited to, Quadrature Amplitude Modulation (QAM) modulators, that radio frequency modulated at least a portion of the input the transport streams 240 and transmit therefrom output transport streams 242. The output signals 242 from the multimodulators 228 are combined, using equipment such as a combiner 230, for input into the transmission medium 250, which is sent via the in-band delivery path 254 to the subscriber locations 108. Thus, in the preferred embodiment, each multimodulator 228 receives a plurality of input transport streams 240, which include programs, or sessions. Details regarding the multimodulator 228 are provided hereinbelow. In the preferred embodiment of the DBDS 100, video, audio, and control information are encoded as program streams, which are then multiplexed to form transport streams 240. Each input transport stream is assigned to a multimodulator 228, which outputs a plurality of radio frequency modulated transport streams 242, and each output transport stream 242 is modulated to a set frequency. For the DHCT 110 (shown in FIG. 1) to receive a television program, the DHCT 110 must tune to the frequency associated with the modulated transport stream that contains the desired information, demultiplex the transport stream, and decode the appropriate program streams.

The control system 232 allows the television system operator to control and monitor the functions and performance of the DBDS 100. The control system 232 interfaces with various components, via communication link 270, in order to monitor and/or control a variety of functions, including the channel lineup of the programming for the DBDS 100, billing for each subscriber, and conditional access for the content distributed to subscribers. Information, such as conditional access information, is communicated from the control system 232 to multiplexer 222, where it is multiplexed into transport stream 240. Among other things, the control system 232 provides input to the multimodulators 228 for setting their operating parameters, such as selecting certain programs or portions of transport streams for inclusion in one or more output transport stream, system specific MPEG table packet organization, and/or conditional access information. Control information and other data can be communicated to hubs 104 and DHCTs 110 via an in-band delivery path 254 or via an out-of-band delivery path 256. The out-of-band data is transmitted via the out-of-band downstream path 258 of transmission medium 250 by means such as, but not limited to, a Quadrature Phase-Shift Keying (QPSK) modem array 260. Two-way communication utilizes the upstream portion 262 of the out-of-band delivery system. Hubs 104 and DHCTs 110 transmit out of band data through the transmission medium 250, and the out of band data is received in headend 102 via out-of-band upstream paths 262. The out-of-band data is routed through router 264 to an application server 216 or to control system 232. The out-of-band control information includes such information as a pay-per-view purchase instruction and a pause viewing command from the subscriber location 108 (shown in FIG. 1) to a video-on-demand type application server 216.

The control system 232, such as Scientific-Atlanta's Digital Network Control System (DNCS), without limitation, also monitors, controls, and coordinates all communications in the subscriber television system, including video, audio, and data. The control system 232 can be located at headend 102 or remotely.

The transmission medium 250 distributes signals from the headend 102 to the other elements in the subscriber television system, such as a hub 104, a node 106, and subscriber locations 108 (shown in FIG. 1). The transmission medium 250 can incorporate one or more of a variety of media, such as optical fiber, coaxial cable, and hybrid fiber-coax (HFC), satellite, direct broadcast, or other transmission media.

Figure 3:
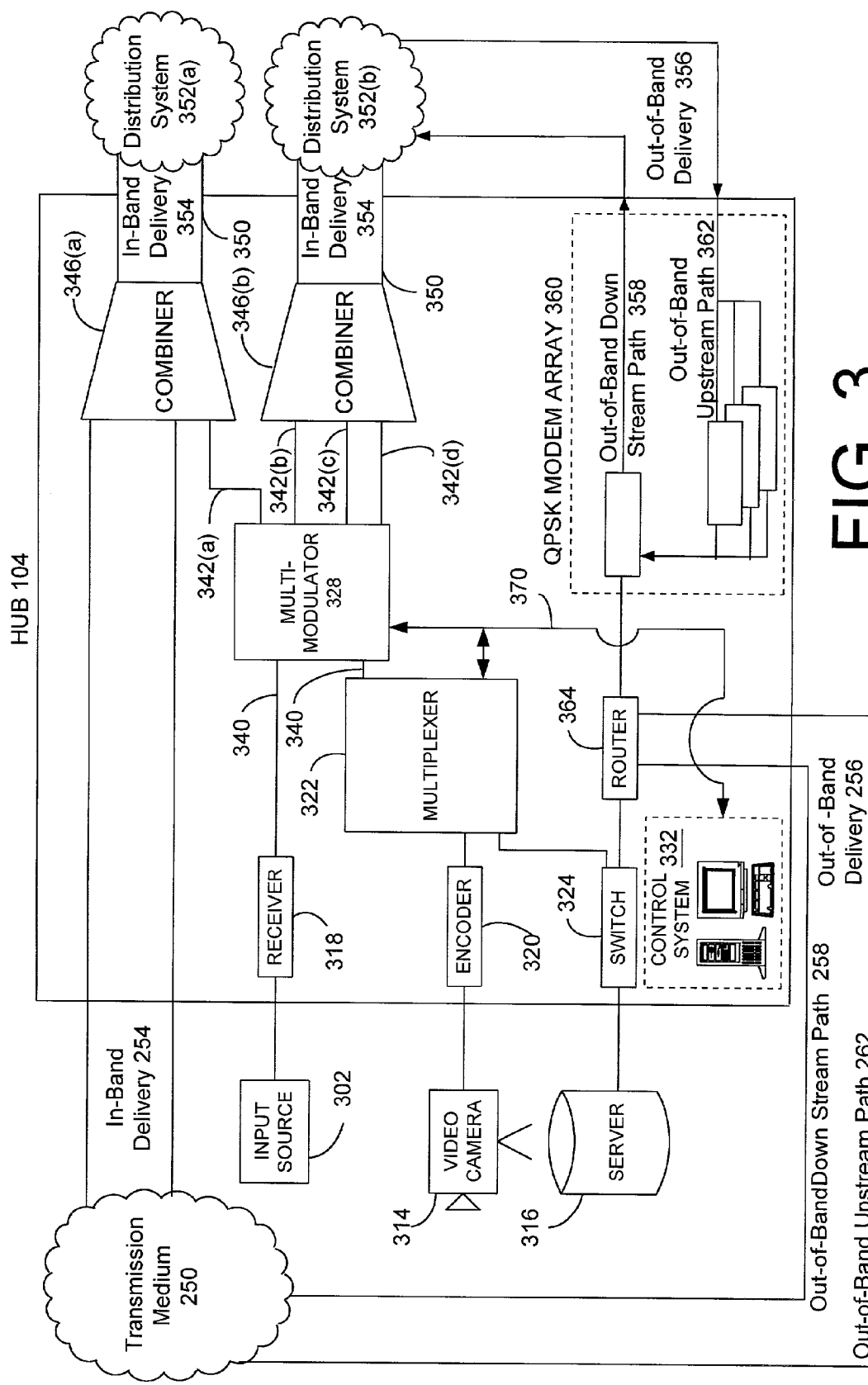
FIG. 3 is a hub in the broadband communication system in which the preferred embodiment of the invention may be employed.

Referring now to FIG. 3, the hub 104, which is remotely located from the headend 102, provides services and programming to the DHCTs in a sub-region of the subscriber television system. The hub 104 receives programming, services, and data from the headend 102 via the in-band delivery path 254 and the out-of-band delivery path 256 of transmission medium 250. In addition, the hub 104 can receive or provide services and programming from a variety of sources, such as, but not limited to, an additional input source 302, a video camera 314, or a sub-region application server 316.

The hub 104 functions as a mini-headend and includes many of the same elements as the headend 102. The hub 104 includes a controller 332 that controls elements, such as multimodulator 328, of hub 104. The controller 332 provides instructions to the elements of hub 104 through communication link 370. The hub 104 also includes a receiver 318 that is associated with input source 302. MPEG encoders, such as encoder 320, are included for encoding such things as local programming or a video camera 314 feed. Some of the signals may require additional processing, such as signal multiplexing prior to being modulated. Such multiplexing is done by multiplexer 322.

A switch, such as ATM switch 324, provides access to the sub-region application server 316. There can be multiple sub-region application servers 316 providing a variety of services such as a Pay-Per-View service, a data service, an Internet service, a network system, or a telephone system. Service and content providers 114 (shown in FIG. 1) may download content to a sub-region application server 316 via transmission medium 250. The services and programming of the sub-region associated with a hub 104 may be orientated to the demographics of the sub-region. This sub-region segmentation of the subscriber television system allows for very localized services and programming such as a neighborhood channel or direct advertising to a specific market segment.

The services and programming for the sub-region are then combined with the other information specific to the DBDS 100, such as services and programming from headend 102. The hub 104 contains a multimodulator 328 to convert the programming information of transport streams 340 into a plurality of modulated output signals 342, which are combined by combiner 346 for transmission over the transmission medium 350. The multimodulators 328 includes a plurality of radio frequency modulators, such as, but not limited to, Quadrature Amplitude Modulation (QAM) modulators, that prepare the formatted information for delivery via the in-band delivery path 354 of the transmission medium 350 to the subscriber locations 108 (shown in FIG. 1). The output signals 342 from the multimodulators 328 are combined, using equipment such as a combiners 346, for input into the transmission medium 350 via the in-band delivery path 354.

Out-of-band data is transmitted to the transmission medium 350 by means such as, but not limited to, Quadrature Phase-Shift Keying (QPSK) modem array 360 via out-of-band downstream path 362. The out-of-band data is transmitted via the out-of-band downstream path 358 of transmission medium 350 by the Quadrature Phase-Shift Keying (QPSK) modem array 360. Two-way communication utilizes the out-of band up stream path 362 of the out-of-band delivery path 356. The received out-of-band information is routed through router 364 to headend 102 and application servers 316. Router 364 provides the interface between hub 104 and headend 102 for out-of-band control information. The out-of-band data is routed to the router 364. Router 364 provides the link between headend 102 and the DHCTs in the sub-region for out-of-band data. In another embodiment, the hub 104 includes a control system that controls the devices in the hub 104 and interfaces with the headend 102 and with the DHCTs 110 connected to the hub 104.

The transmission medium 350 distributes signals from the hub 104 to subscriber locations 108 (shown in FIG. 1) via nodes 106 (shown in FIG. 1). The transmission medium 350 can incorporate one or more of a variety of media, such as optical fiber, coaxial cable, hybrid fiber-coax, satellite, direct broadcast, or other transmission media. An example of a DBDS 100 incorporating multiple varieties of media would be the transmission media referred to as hybrid fiber-coax that includes a transmission medium 250 incorporating fiber-optical cabling and a transmission medium 350 incorporating coaxial cabling. An alternative example of a DBDS 100 incorporating multiple varieties of media includes a transmission medium 250 incorporating fiber-optical cabling from the head end 102 to the node 106 and incorporating coaxial cabling from the node 106 to the subscriber location 108.

With multiple places to introduce services and programming, the control system 232 (shown in FIG. 2) for the subscriber television system must coordinate and control the services and programming available to each DHCT. A service group defines a group of DHCTs that receive services and programming from the same modulators. Therefore, the same services and programming are available to all the DHCTs in a service group, even if some subscribers do not subscribe to the same services and programming.

Figure 4:
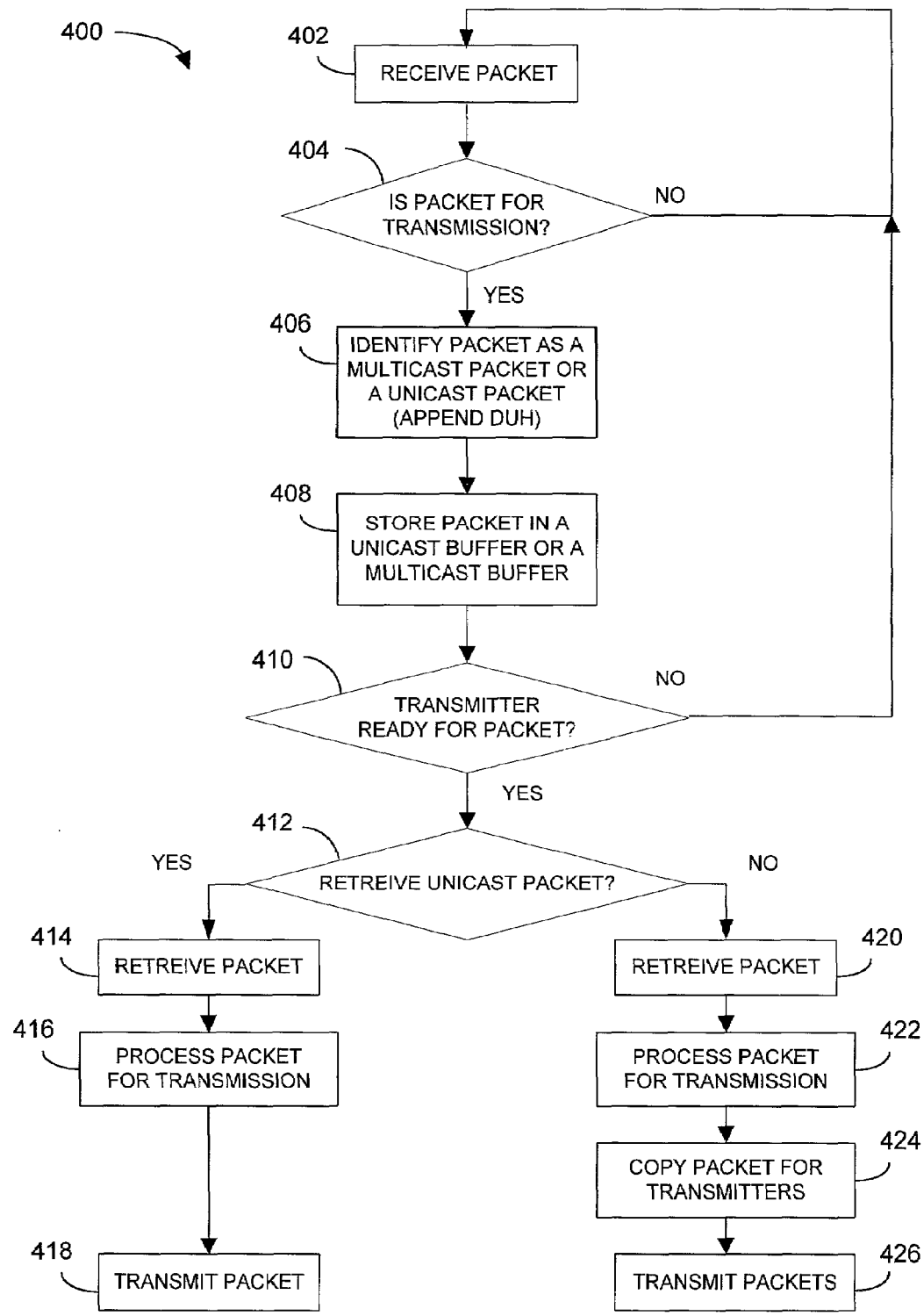
FIG. 4 is a flowchart of the functions performed for multicast packet flow.

Referring now to FIG. 4, briefly described are the steps 400 taken by a multimodulator (228, 328), regardless of where the multimodulator is located in the DBDS 100. In the preferred embodiment, the multimodulator receives a plurality of packetized transport streams and outputs a plurality of radio frequency modulated transport streams, wherein each output transport stream can include any portion of the content in any or all of the input transport streams. The input and output transport streams shall be described hereinbelow as a MPEG transport streams, however, this is for exemplary purposes and those skilled in the art will recognize that the principles of the preferred embodiment of the invention can be used for any packetized transport stream. Furthermore, those skilled in the art will recognize that the steps 400 illustrate steps that may be performed on a packet, not necessarily an MPEG packet, and that the multimodulator is performing many of the steps simultaneously for various packets of the input transport streams.

In step 402, the multimodulator receives a digital packet, such as an MPEG packet, which shall be described in detail hereinbelow, of a transport stream. Not all of the packets of the transport stream are necessarily for transmission downstream. Therefore, in step 404, the multimodulator determines if the received packet is to be transmitted from the modulator. In the preferred embodiment, the multimodulator consults at least one table to determine whether or not to transmit the receive packet. The tables of the multimodulator and the components, such as the memory and the transmitters, of the multimodulator shall be discussed in greater detail hereinbelow. In another embodiment, the multimodulator is instructed by the control system 232 which packets are for transmission. If the packet is for transmission, the multimodulator proceeds to step 406, otherwise the multimodulator returns to step 402 and awaits the next packet of the input transport stream.

In step 406, the multimodulator identifies the received packet as a unicast packet, i.e., a packet that is transmitted from only one transmitter of the multimodulator, or as a multicast packet, i.e., a packet that is transmitted from more than one of the modulators transmitters. In the preferred embodiment, the multimodulator determines from the tables at the multimodulator whether the received packet is a unicast or a multicast packet, and the multimodulator identifies the received packet as a unicast or a multicast packet by appending a data unit header (DUH) to the packet. In an alternative embodiment, the control system 232 determines which packets are unicast packets or multicast packets. The DUH, which will be discussed in greater detail hereinbelow, associates the packet with the transmitter or transmitters from which the packet is transmitted. In an alternative embodiment, the control system 232 determines which packets are unicast packets or multicast packets.

Next, in step 408, the multimodulator stores the packet with the DUH attached thereto in memory. In the preferred embodiment, the memory is partitioned to include a multicast buffer for buffering multicast packets and at least one unicast buffer for buffering unicast packets.

In step 410, the multimodulator determines whether a transmitter is ready to receive a packet for transmission. The method by which the multimodulator determines whether at least one of the transmitters of the multimodulator is ready to receive a packet is discussed in detail hereinbelow. If none of the multimodulator's transmitters are ready to receive a packet for transmission, then the multimodulator returns to step 402. On the other hand, if the multimodulator has at least one transmitter ready to receive a packet for transmission, then the multimodulator proceeds to step 412 and determines whether to retrieve a buffered unicast packet or a buffered multicast packet. In the preferred embodiment, the multimodulator determines whether to retrieve a unicast packet or a multicast packet based at least in part on prior determinations, details of which are provided hereinbelow.

After determining whether to retrieve a buffered unicast packet the multimodulator proceeds to step 414 and retrieves a unicast packet that is associated with a transmitter that is ready to receive a packet for transmission. The packet is then processed for transmission in step 416. Processing can include among other things encrypting the packet.

Next, in step 418, the DUH, which is appended to the process packet, is removed therefrom and the processed packet is modulated and transmitted from the transmitter associated with the packet.

Referring back to step 412, when the multimodulator determines to retrieve a buffered multicast packet, the multimodulator proceeds to step 420 and retrieves a buffered multicast packet that is associated only with transmitters that are ready to receive a packet for transmission. In other words, if a given multicast packet is associated with a transmitter that is not ready to receive a packet for transmission, then that given packet is not retrieved from the multicast buffer.

In step 422, the retrieved multicast packet is processed for transmission from the multimodulator. Again, processing can include among other things encrypting the packet.

In step 424, the multimodulator uses the DUH, which is appended to the packet and which associates the packet with each transmitter from which the packet is transmitted, to make copies of the processed packet for each of the transmitters associated with the DUH.

In step 426, the DUH is removed from each of the copies and the transmitters associated with the DUH receive a copy of the packet and modulates and transmits the packet downstream.

Again, it is to be understood that the steps 400 performed hereinabove are not necessarily performed sequentially. The multimodulator receives at least one transport stream and transmits a plurality of modulated transport streams therefrom. Consequently, in order for the multimodulator not to be a bottleneck in the transport stream, the multimodulator is capable of receiving and transmitting therefrom packets substantially simultaneously. Although the steps 400 are shown as sequential processes, it is really multiple independent threads or processes.

Moving Pictures Experts Group (MPEG) Overview

Figure 5:
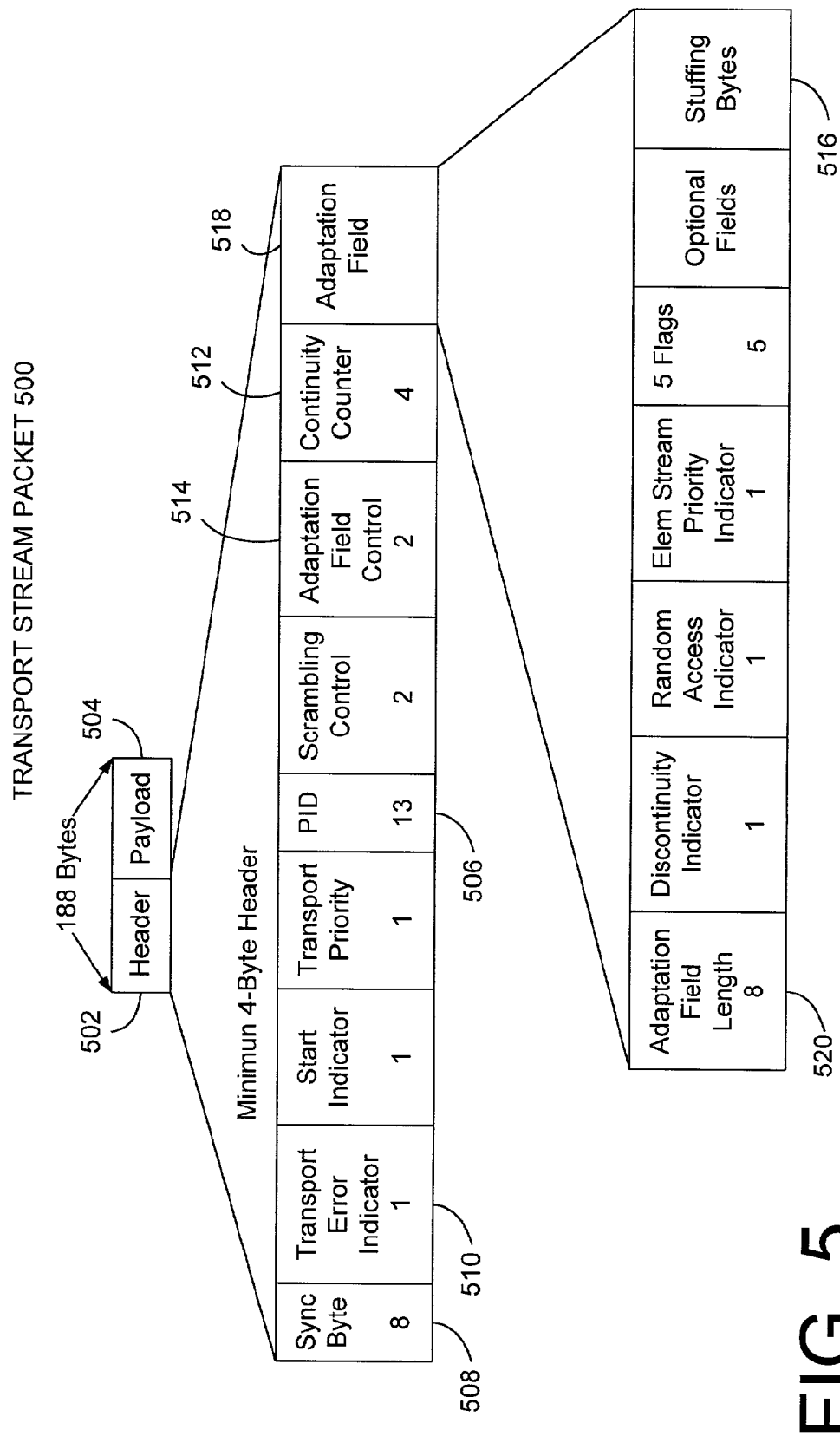
FIG. 5 is a block diagram representation of an MPEG transport packet.

The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1 and MPEG-2 standards are hereinafter referred to as MPEG. In an MPEG encoded transmission, programming and other data are transmitted in packets, which collectively make up a transport stream. An MPEG transport stream includes video packets, audio packets and table packets, which provide information about the organization of the transport stream and about any conditional access scheme that is used. Additional information regarding transport stream packets, the composition of the transport stream, types of MPEG tables and other aspects of the MPEG standards are described below. In addition, FIG. 5 and FIGS. 6A and 6B provide a graphical representation of MPEG information. In an exemplary embodiment, the preferred embodiment of the invention employs MPEG table packets. However, the preferred embodiment of the invention is not so limited, and can be implemented using other types of data.

As mentioned above, an MPEG transport stream is made of packets, where each packet is identified by a packet identifier (PID). A single program, or session, is made up of plurality of data packets such as video packets and audio packets. All of the video packets associated with a given program, or session, included in a transport stream will have the same PID. It is possible that a given program will include a plurality of audio options. For example, a given program might be provided to the user in English, Spanish and German, in which case the program will include three sets of audio packets and each set of audio packets will have a unique PID value in the transport stream. In general, table packets are used to indicate which packets are associated with each program in the transport stream. Additional information regarding the makeup of an MPEG transport stream and its various components is provided below.

Packetized Elementary Stream (PES)

The output of a single MPEG audio or video encoder 220 (of FIG. 2) is an Elementary Stream, which is an endless, near-real-time signal. The Elementary Stream is broken into packets in what is referred to as a Packetized Elementary Stream (PES). These packets include header information to identify the start of the packets and must include time stamps because packetizing disrupts the time axis.

Program Stream (PS)

One video PES and a number of audio PESs can be combined to form a Program Stream (PS), provided that all of the encoders are locked to a common clock. Time stamps in each PES ensure correct correlation or lip-sync between the video and audio.

Transport Stream Packet

A Transport Stream is a multiplex that includes several Program Streams, which are transported in fixed size, 188 byte, transport stream packets 500 (FIG. 5). FIG. 5 illustrates a transport stream packet 500, including a minimum 4 Byte header 502 and a payload 504. The header 502 is further expanded to illustrate the parts thereof. The numbers at the bottom of the cells, such as the 8 in Sync Byte field 508, indicate the fixed bit size of the cell. Cells with no number, such as adaptation field 518, do not have a fixed size. In header 502, the more important information includes the following:

Sync byte cell 508 is recognized by a de-multiplexer or decoder so that alignment to the start of a packet can be determined.

Transport error indicator cell 510, which is set if the error correction layer above the transport layer is experiencing a raw bit error rate (BER) that is too high to be correctable. It indicates that the packet may contain errors.

Packet Identifier (PID) cell 506, which is a thirteen-bit code used by a de-multiplexer or decoder to distinguish between different types of packets.

Continuity counter cell 512 is a four-bit value that is incremented by the encoder as each new packet having the same PID is sent. It is used to determine if any packets are lost, repeated, or out of sequence.

Header 502 also includes a start indicator cell, a transport priority cell, a scrambling control cell, an adaptation field control cell 514, and an adaptation field cell 518. When the adaptation field 518 is non-zero, the adaptation field 518 includes an adaptation field length cell 520, a discontinuity indicator cell, a random access indicator cell, an elementary stream priority indicator cell, a 5 flags cell, an optional fields cell, and a Stuffing Bytes cell 516.

In some cases more information is needed in header 502. The header can be expanded using adaptation field cell 518. If header 502 is expanded, payload 504 becomes smaller to maintain the fixed packet size of 188 bytes.

Stuffing Packets

When the required bit rate or packet size is less than the fixed bit rate or fixed packet size, the excess capacity is filled by inserting stuffing. Stuffing can be used in two ways, as stuffing bytes or as a stuffing packet. Stuffing bytes can be used with a partial payload to fill up the remainder of transport stream packet 500 (shown in FIG. 5) to maintain the fixed packet size. Stuffing bytes can be in the payload 504 or in the Stuffing Bytes cell 516 of an expanded header 502. One or more stuffing packets transport stream packets 500 with only header and stuffing, can also be used in a fixed rate bit stream to maintain the fixed bit rate. The stuffing packet is used to fill unused or excess capacity. PID value of 8191 or thirteen 1's generally identifies stuffing packets. Demultiplexers and decoders ignore packets thus identified as stuffing packets. Stuffing can be all ones (1), all zeros (0), pseudo-random 1s and 0s, or an ignore flag followed by any of the other options.

Transport Stream (TS)

Referring now to FIGS. 6A and 6B, several programs and their associated PESs are multiplexed to form a single Transport Stream (TS) 602 (FIG. 6B). A Transport Stream 602 differs from a Program Stream in that the PES packets are further subdivided into short fixed-size (i.e., 188 byte) transport stream packets 500 (shown in FIG. 5) and in that multiple programs encoded with different clocks can be carried in the transport stream. This is possible because a transport stream 602 has a session clock reference (PCR) mechanism that allows transmission of multiple clocks.

The fixed-size transport stream packets 500 of Transport Stream 602 each contain 188 bytes. Many different programs streams are multiplexed in the transport stream 602. Program streams are made up of a plurality of video, audio, data and other streams, or PID streams. Each PID stream is made up of a stream of packets having a common PID value.

In advanced applications, each program may use a different compression factor and a bit rates that can change dynamically even though the overall bit rate for Transport Stream 602 stays constant. Statistical multiplexing allows a program temporarily requiring a larger bandwidth to borrow bandwidth from a program that is not using all of its allocated bandwidth. In addition, each video PES could have a different number of audio and data PESs associated with it. With this flexibility in the make-up of Transport Stream 602, a decoder or demultiplexer must be able to change from one program to the next and correctly select the appropriate audio and data channels. MPEG tables described herein below facilitate this changing and selecting.

A Transport Stream 602 is more than just a multiplex of audio and video packets. In addition to the compressed audio, video, and data, Transport Stream 602 includes a great deal of information that describes the bit stream. This information is found in MPEG tables such as Program Specific Information tables or System Information tables, which describe the relationships of the MPEG packets and identify their corresponding packet identifier (PID) value. Each packet carries a PID 506 (see FIG. 5) located in the packet header 502. The MPEG tables list the PIDs for all packets associated with a particular program. The decoder or demultiplexer uses the PIDs to change from one program to the next and correctly select the appropriate audio and data channels.

FIG. 6A and FIG. 6B, illustrates the relationship between the transport stream 602, the MPEG packets and tables therein, and the function of PIDs. Illustrative of the function of PIDs, they can be used to locate the associated tables in FIG. 6A or the corresponding packets in FIG. 6B.

FIG. 6A, represents the different MPEG tables in the MPEG transport stream 602. For example, Program Association Table 604, which is a packet in transport stream 602 that is identified by a PID having a value of 0, indicates that all packets with a PID value of 22 are Program Map Tables (PMT) associated with program 1. The PMT 622, which has a PID value of 22, indicates the PIDs of the MPEG packets 500 that make up the various components of the program stream associated with program 1. For the purposes of this disclosure, with regard to this embodiment of an MPEG implementation, a program stream is made up of the packets identified in a PMT packet.

FIG. 6B, represents some of transport stream packets 500 found in a typical MPEG transport stream 602. The transport stream packets 500 are labeled and display their corresponding PID values. The PIDs can identify an associated table of FIG. 6A. For example, in FIG. 6B, the packet 622, which has a PID value of 22, corresponds to the PMT 622 of FIG. 6A.

Program Specific Information (PSI)

In accordance with this embodiment, a demultiplexer or decoder can correctly select packets only if it can correctly associate them with the transport stream 602 to which they belong. A demultiplexer or decoder can do this task if it knows what the right PIDs are. This is the function of the Program Specific Information (PSI) tables.

The PSI includes the Program Association Table (PAT) 604, a Conditional Access Table (CAT) 608, and the Program Map Table (PMT). In FIG. 6A two PMTs are shown, Program 1 PMT 622 and Program 3 PMT 630.

The PSI tables are carried in packets having unique PIDs; some of which are standardized and some of which are specified by the PAT 604 and the CAT 608. These table packets are repeated periodically in every transport stream. The PAT 604 has a PID of 0, the CAT 608 has a PID of 1, and stuffing packets have a PID of 8191. These are fixed PIDs in the MPEG system. The demultiplexer or decoder determines the remaining PIDs by accessing the appropriate table(s).

The Program Association Table (PAT) 604 lists every program in transport stream 602. The PAT 604 identifies the PID values for the packets containing the associated Program Map Tables (PMT) 606 for the programs included in transport stream 602. For example, PAT 604 identifies all packets with PID 22 as being a PMT 622 associated with program 1.

The video, audio and data elementary streams that belong in the same program stream are listed in a PMT 606 with their associated PIDs. For example, PMT 622 lists a video stream, two audio streams, a data stream, and other elementary streams belonging to program 1. PMT 622 also identifies the associated PID values for each PID stream of program 1, such as the PID value of 54 for all program 1 video streams.

In FIG. 6A, the PAT 604 associates the PID value of 33 with all program 3 PMT 630 packets. In the corresponding PMT 630, elementary stream 1 identifies as a video stream all packets with a PID value of 19. All program 3 video 1 packets, in transport stream 602, have PID value of 19 as indicated by arrows 620 of FIG. 6B. PMT 622 indicates that all video packets associated with program 1 have a PID value of 54. Arrows 654 in transport stream 602 of FIG. 6B indicate these packets. The decoder (or a demultiplexer) can select all data for a given elementary stream by accepting only packets with the right PID value, such as a PID value of 19 for elementary stream 1 video, and rejecting the remainder. Data for an entire program can be selected using the PID values in a PMT. For example, for the entire program 3, using PMT 630, select all video packets with a PID value of 19, audio packets with a PID value of 82 and data packets with a PID value of 88. Packet-continuity counts ensure that every packet that is needed to decode a stream is received.

Some or all of the programs are protected or tiered so that those who have paid a subscription or fee can only view them. The transport stream 602 contains conditional access information, Conditional Access Table (CAT) 608, to administer this protection, located at PID 1 and labeled EMM in transport stream 602. The PIDs for Entitlement Management Messages (EMM) are listed in the CAT 608 packets (PID=1).

Consequently, if the decoding of a particular program is required, reference to the PAT 604 and then a PMT 606 is all that is needed to find the PIDs of all of the elementary streams in the program. If the program is encrypted, then access to the CAT 608 may also be necessary.

System Information Table

The first entry in the PAT 604, session 0, indicates the PID of the System Information Table 610. A given System Information Table 610 contains details of more than just the transport stream 602 carrying it or the PSI of the transport stream. The System Information Table 610 may also include details of other transport streams that may be available to the same decoder, for example, by tuning to a different RF channel or steering a dish to a different satellite. The System Information Table 610 may list a number of other transport streams and each one may have a descriptor that specifies the radio frequency, orbital position, and so on. System Information Table 610 provides information describing the overall system signal(s) of a specific television system 100.

Types of a System Information Table 610 include a Digital Video Broadcast (DVB) standard Network Information Table (NIT) and an Advanced Television Systems Committee (ATSC) standard System Information (SI) table. DVB and ATSC transport streams may also contain additional service information.

Those skilled in the art will appreciate that FIGS. 5-6 are intended to provide a brief, general description of a typical television system and MPEG encoded data, and that additional information is readily available from a variety of sources.

Multimodulator

The logic of the present invention can be implemented in hardware, software, firmware, or a combination thereof. In the preferred embodiment, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Figures 7A, 7B:
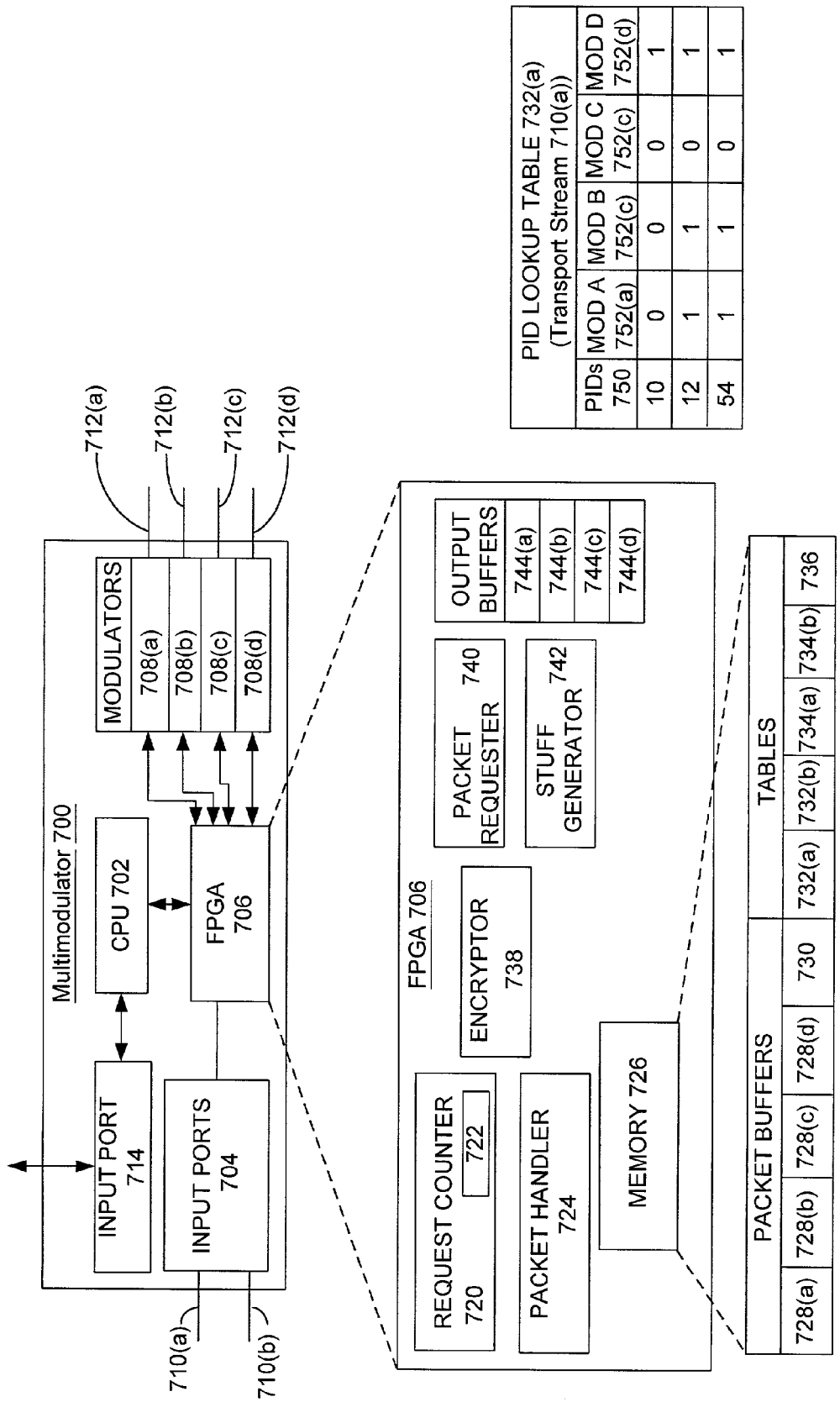
FIG. 7A is a block diagram of a multimodulator's functional components.
FIG. 7B is a diagram of a table used in the multimodulator.

Referring now to FIG. 7A, multimodulator 700 of the preferred embodiment can be located in various locations within the DBDS 100, such as but not limited to head end 102 and hubs 104. The multimodulator 700 includes input ports 704 that are adapted to receive the transport streams 710(a) and 710(b), which include packets of digital data. In other embodiments, the multimodulator 700 is adapted to receive fewer or more transport streams. In the preferred embodiment, the input ports 704 are adapted to receive high speed broadband transport streams of digital data packets, a non-limiting example of which is a conventional asynchronous serial interface (ASI) compatible input port, and the transport stream 710 conforms to ASI protocols.

The multimodulator 700 further includes a plurality of modulators 708(a) through 708(d) that radio frequency modulate the received transport stream packets into output transport streams 712. In the preferred embodiment, the modulators 708 are QAM modulators. The frequency at which each output transport stream 712 is modulated depends in part on where the transport stream is destined. For example, referring to FIG. 2, the output transport stream 242(a) and 242(b) are transmitted to combiner 230(a), and consequently, the pair of transport streams 242(a) and 242(b) must be modulated at different frequencies. However, because the transport streams 242(a) and 242(b) are not combined with the transport streams 242(c) and 242(d), the transport stream 242(a) or 242(b) can be modulated at the same frequency as either of the transport streams 242(c) or 242(d). Thus, the frequency or frequencies of the transport streams 712(a) through 712(d) can be the same frequency or different frequencies as long as, for example, none of the transport streams 712(a) through 712(d) are combined with a transport stream that is modulated at the same frequency.

The multimodulator 700 further includes a central processing unit (CPU) 702, a field programmable gate array (FPGA) 706, and a second port 714. Through port 714 the CPU 702 receives messages from the control system 232 (shown in FIG. 2), or the controller 332 (shown in FIG. 3). The received messages include programming, or sessions, messages, which identify a program, or a session, of an input transport stream 710 and identify the output modulator(s) 708 from which that program is transmitted.

The FPGA 706 receives the incoming transport stream packets of the transport stream 710 and identifies for each transport stream packet 500 the modulator 708, if any, from which the transport stream packet 500 is to be transmitted. In some cases, received transport stream packets are not retransmitted, based on controls received through input port 714. Details by which the FPGA 706 identifies and processes the received transport stream packets will be provided hereinbelow.

Figure 8:
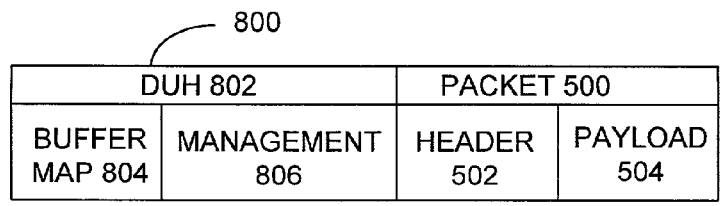
FIG. 8 is a block diagram of a Data Unit Header (DUH).

The FPGA 706 includes a packet handler 724 that receives the input transport stream packets 500 and stores them in a memory 726. In the preferred embodiment, prior to storing the transport stream packets 500 in memory 726, the packet handler 724 prepends a Data Unit Header (DUH) 802, which is shown in FIG. 8, to the received packets 500. A data unit packet 800, shown in FIG. 8, includes the DUH 802 and the packet 500 having the packet header 502 and the payload 504. Further details of the DUH 802 will be provided hereinbelow.

Referring again to FIG. 7A, the packet handler 724 also retrieves data unit packets 800 from the memory 726 based at least in part upon a request from packet requester 740 and request counter 720. The method by which the packet handler 724 stores and retrieves data unit packets 800 will be described in greater detail hereinbelow.

After the packet handler 724 has retrieved a data unit packet 800 from memory 726, the packet handler 724 determines whether the payload 504 of the data unit packet 800 should be encrypted prior to transmission from the multimodulator 700. In one embodiment, the encryption information is included in the management field 806 of the DUH 802. In another embodiment, the packet handler 724 consults a table to determine whether to encrypt the payload 504 of the data unit packet 800. In one embodiment, when the payload 504 of the retrieved data unit packet 800 should be encrypted the packet handler 724 sends the data unit packet 800 to the encryptor 738 where the payload 504 of data unit packet 800 is encrypted. After the encryptor 738 has encrypted the payload 504 of the data unit packet 800, the data unit packet 800 is sent to the packet requestor 740. When the payload 504 should not be encrypted the data unit packet 800 is sent directly to the packet requestor 740. In another embodiment, the data unit packet is sent to the encryptor 740, and the encryptor 740 determines whether or not to encrypt the payload 504 of data unit packet 800 prior to sending the data unit packet to the packet requestor 740. The packet requestor 740 receives the data unit packet 800 and puts the transport stream packet 500 of the data unit packet 800 in at least one output buffer 744. Each of the modulators 708(*a*)-708(*d*) is in communication with a corresponding output buffer 744(*a*)-744(*d*), respectively. When a particular modulator 708, such as modulator 708(*a*), is ready to receive a transport stream packet 500 for transmission therefrom, the particular modulator sends a message to the FPGA 706 requesting a transport stream packet 500. The FPGA 706 responds to the message by sending a transport stream packet 500 from the particular output buffer 744, such as output buffer 744(*a*), to the particular modulator 708, such as modulator 708(*a*), which requested a transport stream packet 500.

The memory 726 includes a plurality of unicast packet buffers 728(*a*) through 728(*d*) and a multicast packet buffer 730. The unicast packet buffers 728(*a*) through 728(*d*) are associated with output buffers 744(*a*)-744(*d*), respectively, and with modulators 708(*a*) through 708(*d*), respectively. In the preferred embodiment, each of the unicast packet buffers 728(*a*) through 728(*d*) are first-in-first-out (FIFO) buffers for temporarily storing packets that are for transmission from only their respective associated modulator. For example, a data unit packet 800, which includes a transport stream packet 500 that is for transmission from only modulator 708(*a*), is stored in unicast buffer 728(*a*). The multicast buffer 730 is for storing packets that are for transmission from more than one of the modulators 708(*a*) through 708(*d*). For example, a data unit packet 800, which includes a transport stream packet 500 that is to be transmitted from modulators 708(*a*) and 708(*d*), is stored in multicast buffer 730.

The memory 726 also includes a PID look-up table 732 for each input transport stream 710. PID look up tables 732(*a*) and 732(*b*) are associated with input transport streams 710(*a*) and 710(*b*), respectively. The PID look-up tables 732(*a*) and 732(*b*) identify the packets of their respective transport streams that are transmitted from at least one of the modulators 708(*a*)-708(*d*). For example, referring to PID look up table 732(*a*), shown in FIG. 7B, packets of transport stream 710(*a*) that have a PID value of 10 are transmitted from modulator 708(*d*) and are referred to as unicast packets.

The memory 726 further includes slot tables 734(*a*) and 734(*b*) that are associated with PID look-up table 732(*a*) and 732(*b*), respectively. The slot table 734 is a management table that includes information related to encryption keys, which are used by the encryptor 738 for encrypting the transmitted packets. The slot table 734 also includes information regarding the number of received packets per each of the PIDs, continuity count errors, transport errors, and information for remapping the PID values of the packets in the incoming transport streams 710.

The memory 726 also includes free PID table 736, which is maintained by the CPU 702 as are the PID look up tables 732 and slot tables 734. The free PID table 736 is a table of all of the PID values that have not been allocated to any packet included in transport streams 712(*a*) through 712(*d*). Briefly described, there are 8,192 possible PID values ranging from 0 to 8,191. Certain PID values such as 0, 1 and 8,191 are reserved for identifying PAT packets, CAT packets and stuffing packets, respectively. All PID values, which are not reserved, are initially included in the free PID table 736. PID values that are currently being used to identify packets that are being transmitted from any of the modulators 708(*a*)-708(*d*) are not included in the free PID table 736. Those skilled in the art will recognize that other memory structure or tables can be used to accomplish the functionality described hereinabove. For example, in another embodiment, the CPU 702 maintains a master program table that includes all of the functionality of the PID look up tables 732 and the slot tables 734. In another embodiment, the functionality of the PID look up tables 732, the slot tables 734 and the free PID table 736 is split between the multimodulator 700 and the control system 232.

Referring now to FIG. 7B, exemplary PID look-up table 732(*a*) is associated with transport stream 710(*a*). PID identifier 750 indicates the PID values of the transport stream packets 500 of transport stream 710(*a*) that are to be transmitted from multimodulator 700. The PID identifier 750 is associated with a plurality of modulator fields 752(*a*) through 752(*d*) that identify the modulators 708 from which the packets are to be transmitted. In an embodiment, a modulator field having a value of zero indicates that the modulator associated with the modulator field 752 does not transmit the packet, and a value of one indicates the modulator does transmit the packet. Thus, the packet received in transport stream 710(*a*) having a PID value of 54 is transmitted from modulators 708(*a*), 708(*b*) and 708(*d*) in output transport streams 712(*a*), 712(*b*) and 712(*d*), respectively, such packets are referred to as multicast packets.

Figure 9A:
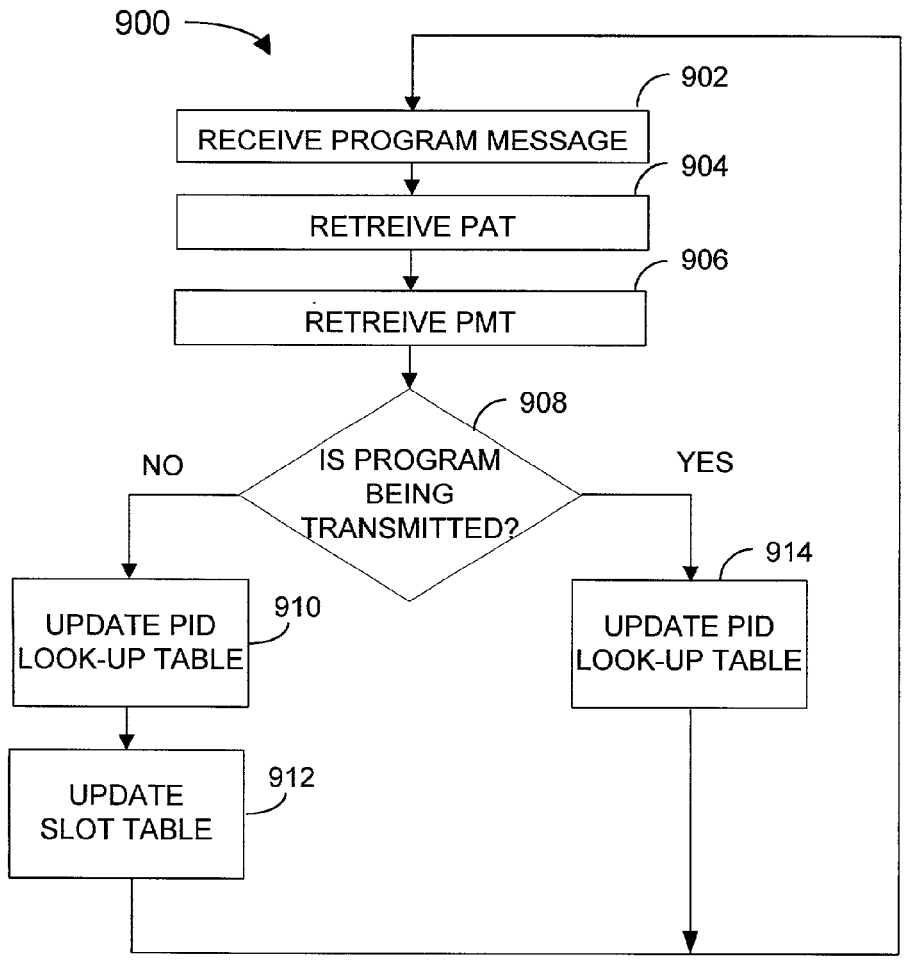
FIG. 9A is a flowchart of a for creating a session.
Figure 9B:
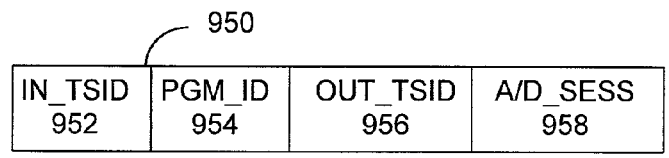
FIG. 9B is a block diagram of program message.

Referring now to FIG. 9A, shown are the steps 900 taken, in one implementation, by the CPU 702 and the FPGA 706 to update/create the PID look-up table 732. In step 902, the CPU 702 receives a program message 950 from the control system 232. An exemplary program message 950 is shown in FIG. 9B. The program message 950 includes an input transport stream identifier field (IN_TSID) 952, a program identifier field (PGM_ID) 954, and an output transport stream identifier field (OUT_TSID) 956. An example program message 950 indicates that program 3 of transport stream 710(*a*) is to be transmitted from modulator 708(*c*).

In step 904, the CPU 702 retrieves from the FPGA 706 the PAT packet (PID=0) of the transport stream identified by IN_TSID 952 and determines the PID value of the PMT that is associated with the program identified by the PGM_ID 954. For example, when the program message 950 indicates program 3 of transport stream 710(*a*), then, referring to FIG. 6A, the CPU 702 uses packet 604, which is a PAT packet (PID=0), to determines that the PID value for the PMT associated with program 3 is 33. In the preferred embodiment, the memory 726 has the PATs and PMTs stored therein (not shown). In another embodiment, the FPGA 706 provides the CPU 702 with the PATs and PMTs when the PATs and PMTs are received through input transport streams 710.

Referring again to FIG. 9A, next in step 906, the CPU 702 retrieves the appropriate PMT packet of the identified transport stream from the FPGA 706 and looks up the PID values for all of the packets that are associated with the program identified in the program message, i.e., the packets that make up the program stream. Referring again to FIG. 6A, the packet 630, which is the PMT of program 3, includes PID values for all of the packets that comprise program 3.

In step 908, the CPU 702 determines whether the program of the program message 950 is already being transmitted from any of the modulators 708. One method by which the CPU 702 determines the status of the program is by comparing the appropriate PID look-up table 732 with the appropriate PMT, and if any of the PID values match, then the program is already being transmitted. For example, the PID look-up table 732(*a*) indicates that packets of transport stream 710(*a*) having a PID value of 54 are currently being transmitted from modulator 710(*a*), 710(*b*) and 710(*d*). Thus, program 1 of transport stream 710(*a*) is currently active. Those skilled in the art will recognize that there are many ways to determine whether a program is currently active, and that the above description is only a non-limiting example of one possible method. Other possible methods include, but are not limited to, having active program tables that indicate programs that are currently being transmitted from multimodulator 700.

If the CPU 702 determines that the program is not being transmitted from any one of the modulators 708(*a*) through 708(*d*), then the CPU 702 initiates a new session, i.e., the transmission of the program from the multimodulator 700.

In step 910, the CPU 702 updates the PID look-up table 732 to include all of the PID values that make up the program stream for the program associated with the PGM_ID 954, and associates the modulator field 752 with the OUT_TSID 956 for each PID value of the program stream. For example, the exemplary program message 950 indicated that program 3 of transport stream 710(*a*) was the particular program to be transmitted. In which case, using the PMT packet 630 (shown in FIG. 6) the CPU 702 would add the set of PID values (19, 81, 82 and 88) contained in the PMT packet 630 to the PID look-up table 732(*a*) (shown in FIG. 7B). The CPU 702 would also set the modulator field 752(*c*) for each PID identifier 750 having a value of 19, 81, 82 and 88. In step 912, the CPU 702 updates management tables, such as the free PID table 736 and the slot table 734 that is associated with the PID look-up table 732. The CPU 702 updates the slot table 734 so that the packet handler 724 and the encryptor 738 can perform the necessary packet management functions, such as encryption and making and routing PAT, PMT, CAT packets for the output transport streams 712.

In the preferred embodiment, when the CPU 702 starts a new session it consults the free PID table 736 and assigns a set of output PID values from the free PID table 736 to the packets of the program stream associated with the new session. For example, when a session for program 3 of transport stream 710(*a*) is started, the CPU 702 uses the FREE PID look up table 736 to map the set of PID values 19, 81, 82 and 88 to a set of PID values, such as 20, 21, 22 and 24, that are currently not used in any of the transport streams 712. The CPU 702 also updates the free PID value table 736 to indicate that the set of output PID values have been allocated. Remapping the PID values of transmitted packets prevents PID collisions in the output transport streams 712(*a*)-712(*d*). A PID collision occurs in a transport stream when two or more packets, which are associated with different programs, have the same PID values. Every session has a unique set of output program PID values that are allocated only to that program. Thus, new sessions can be added to an output transport stream without having any PID conflicts.

If, on the other hand, the CPU 702 determines in step 908 that the program of the program message 950 is already being transmitted from at least one of the modulator 710, then, in step 914, the CPU 702 updates the PID look-up table 732 by associating the modulator field 752 for the packets that make up the program, or session, with the OUT_TSID 956. For example, if the program message 950 could indicate that program 1, which includes packets having a PID value of 54

(see FIG. 6A), are to be transmitted from modulator 708(*c*), then modulator field 752(*c*) would be set to 1.

Referring again to FIG. 9B, it should be noted that the control system 232 could also drop a program, or session, from a transport stream. Thus, the program message 950 also includes an add/drop session field (A/D_SESS) 958 that indicates whether the multimodulator 700 is to add or drop the session identified by In_TSID 952 and PGM_ID 954. When the A/D_SESS 958 indicates a drop the CPU 702 determines if the program is currently being transmitted from more than one modulator 708, and if it is, then it drops the program from the transport stream indicated by OUT_TSID 956 of the program message 950. The CPU 702 drops the program from the output transport stream by setting the modulator field 752 of the appropriate PID look up table 736 to zero for each packet of the program stream of the program associated with the PGM_ID 954. For example, if the program message 950 indicated that program 1 of transport stream 710(*a*) was to be dropped from output transport stream 712(*b*), then the CPU 702 would read the PAT packet 604 of transport stream 710(*a*) to determine the PMT packet 622 associated with program 1. From the PMT packet 622, the CPU 702 would determine the set of program PID values (48, 49, 66, 54), and then set the modulator field 752(*b*) of PID look up table 732(*a*) to zero for each PID identifier 750 that is included in the set of program PID values.

On the other hand, if the program is only being transmitted from one modulator 710, then the CPU 702 removes the set of program PID values associated with the program from the PID look-up table 732 and returns the set of output PID values allocated to the program to the free PID value table 736.

Referring now to FIG. 8, in the preferred embodiment, a packet 800 in the FPGA 706 includes the DUH 802 and the transport stream packet 500. The DUH 802 is prepended to the transport stream packet 500 by the packet handler 724. The DUH 802 includes a modulator identifier (BUFFER MAP) 804 and a management field 806. The modulator identifier 804 corresponds to the modulator fields 752(*a*)-752(*d*) of the PID look up table 732 for a packet. Thus, the modulator identifier 804 indicates the modulators from which the packet 500 is to be transmitted. For example, the PID look up table 702(*a*) indicates that a packet received through transport stream 710(*a*) having a PID value of 12 is to be transmitted from modulators 708(*a*), 708(*b*) and 708(*d*). The modulator identifier 804 would indicate modulators 708(*a*), 708(*b*) and 708(*d*), when the DUH 802 is appended to a packet received through transport stream 710(*a*) having a PID value of 12.

The management field 806 includes management information, such as, but not limited to, remapping of the input PID value to the output PID value and encryption. Thus, when the packet handler 724 receives a packet that has a PID value that is included in the PID look-up table 732, the packet handler prepends a DUH 802 to the packet 500 and stores the packet 800 in the appropriate unicast buffer 728 or multicast buffer 730, depending on whether the packet is a unicast packet or a multicast packet based upon information from PID look up table 732. In the preferred embodiment, the management information field 806 is written to by the packet handler 724 using information from slot table 734.

The packet handler 724 also uses information included in the slot table 734 to map the PID value of the packet 500 to an output PID value. The output PID value is the PID value the packet 500 has in transmission streams 712. The remapping of the input PID values can occur at anytime prior to the transmission of packet 800. In the preferred embodiment, the packet handler 724 remaps the PID value of transport stream packet 500 before storing the data unit packet 800 in memory 726. In another embodiment, the packet requestor 740 remaps the PID value of a transport stream packet 500 before storing the packet in output buffers 744.

Before describing how the packet handler 724 retrieves packets from the memory 726 in response to a request from the packet requester 740, the manner in which the packet requester 740 monitors the output buffers 744 and uses the stuff generator 742 to keep the output buffers 744 at a desired level shall be discussed.

Figure 10:
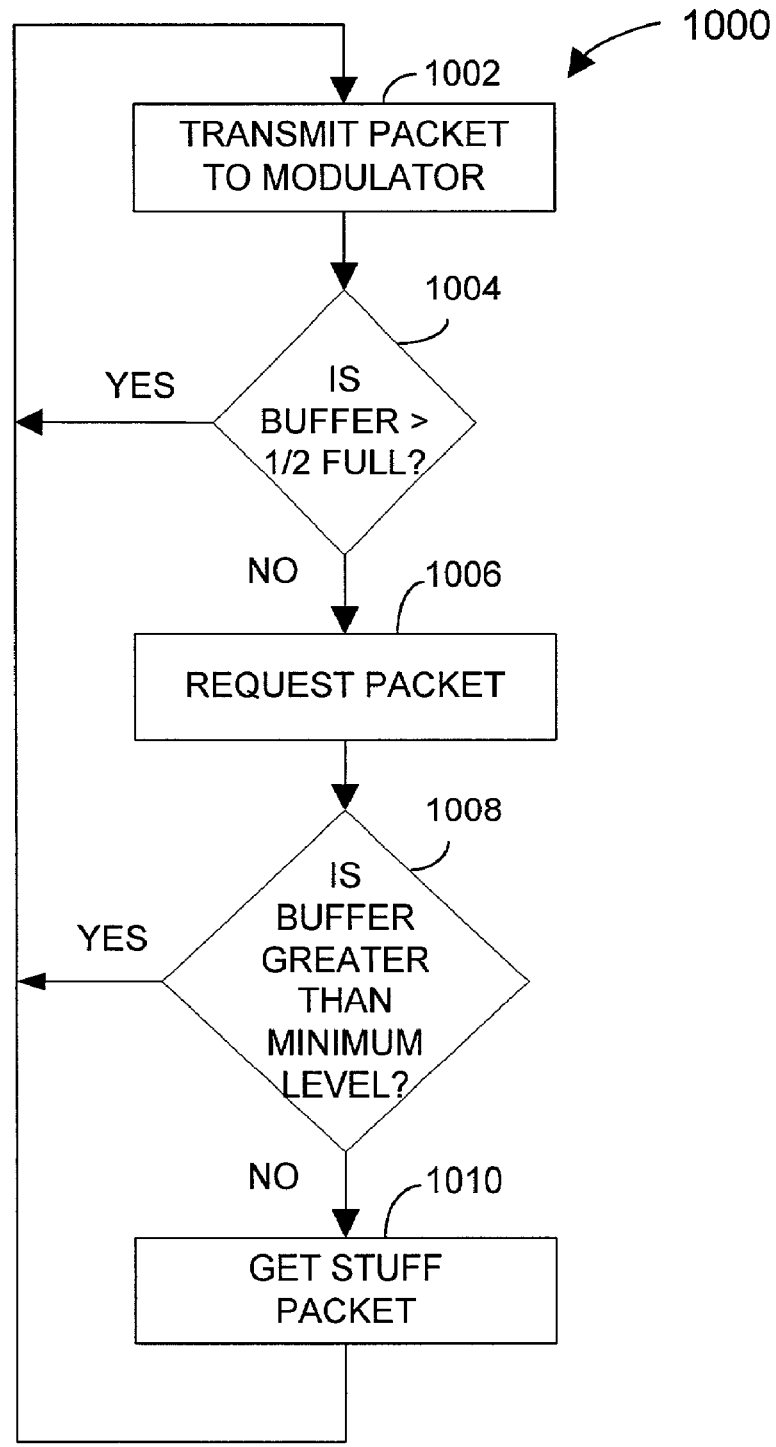
FIG. 10 is a flowchart of a method for maintaining buffer levels within a predetermined range.

Referring now to FIG. 10, steps 1000 are implemented by the FPGA 706 to maintain the output buffers 744 at the desired level. In step 1002, a transport stream packet 500 is transmitted from a particular output buffer of the plurality of output buffers 744(a)-744(d) to the modulator 708 associated with the particular output buffer. For example, when modulator 708(b) is ready to receive a transport stream packet 500 for transmission therefrom, the modulator 708(b) sends a message to the FPGA 706, which responds by transmitting a transport stream packet 500 from output buffer 744(b) to modulator 708(b).

In step 1004, the packet requester 740 checks the status of the particular output buffer that has just transmitted a transport stream packet 500, such as for example output buffer 744(b). The packet requester 740 determines if the particular output buffer is more than half full, and if it is the packet requester 740 waits for any of the output buffers 744 to transmit a transport stream packet 500 to a modulator 708. On the other hand, if the particular output buffer is one-half or less full, then in step 1006, the packet requester 740 sends a message to the request counter 720 requesting a data unit packet 800 for the particular output buffer 744.

The request counter 720 maintains a request count register 722 for each of the output buffers 744(a)-744(d). When the packet requester 740 sends a packet request for a particular output buffer to the request counter 720, the request counter 720 increments by one the count of the request count register 722 associated with the particular output buffer. For example, when a transport stream packet 500 is sent form the output buffer 744(b) to modulator 708(b) and is then less than half full, the packet requestor 740 sends a message, which indicates that the output buffer 744(b) is ready for a transport stream packet, to the request counter 720. The request counter 720 processes the message and increments the request count register 722, which is associated with output buffer 744(b), by 1.

In step 1008, the packet requester 740 checks the level of the particular output buffer, such as output buffer 744(b), and determines whether the buffer level is below a predetermined minimum level, such as one-quarter full. When the level of the particular buffer is lower than the predetermined minimum level, then in step 1010 the packet requester 740 gets a stuff packet from the stuff generator 742 and puts the stuff packet in the particular buffer, for example output buffer 744(b). Thus, the packet requester 740 maintains the levels of the buffers 744 so that the modulators 708 will not run out of transport stream packets for transmission. Also, the output buffers 744 do not overflow, because the packet requester 740 only requests a packet for a particular output buffer 744 when the particular output buffer is one-half or less full. Thus, the particular output buffer 744, which has just transmitted a packet, will always have room to receive a packet, and when necessary it will also have at least one stuff packet for its respective modulator. The above method for monitoring the status of the output buffer 744 and for providing that the output buffers 744 do not overflow is a non-limiting example of one method, which is provided for exemplary purposes. Those skilled in the art will recognize other methods for preventing the output buffer 744 from overflowing, and all such methods are intended to be within the scope of the invention.

Figure 11:
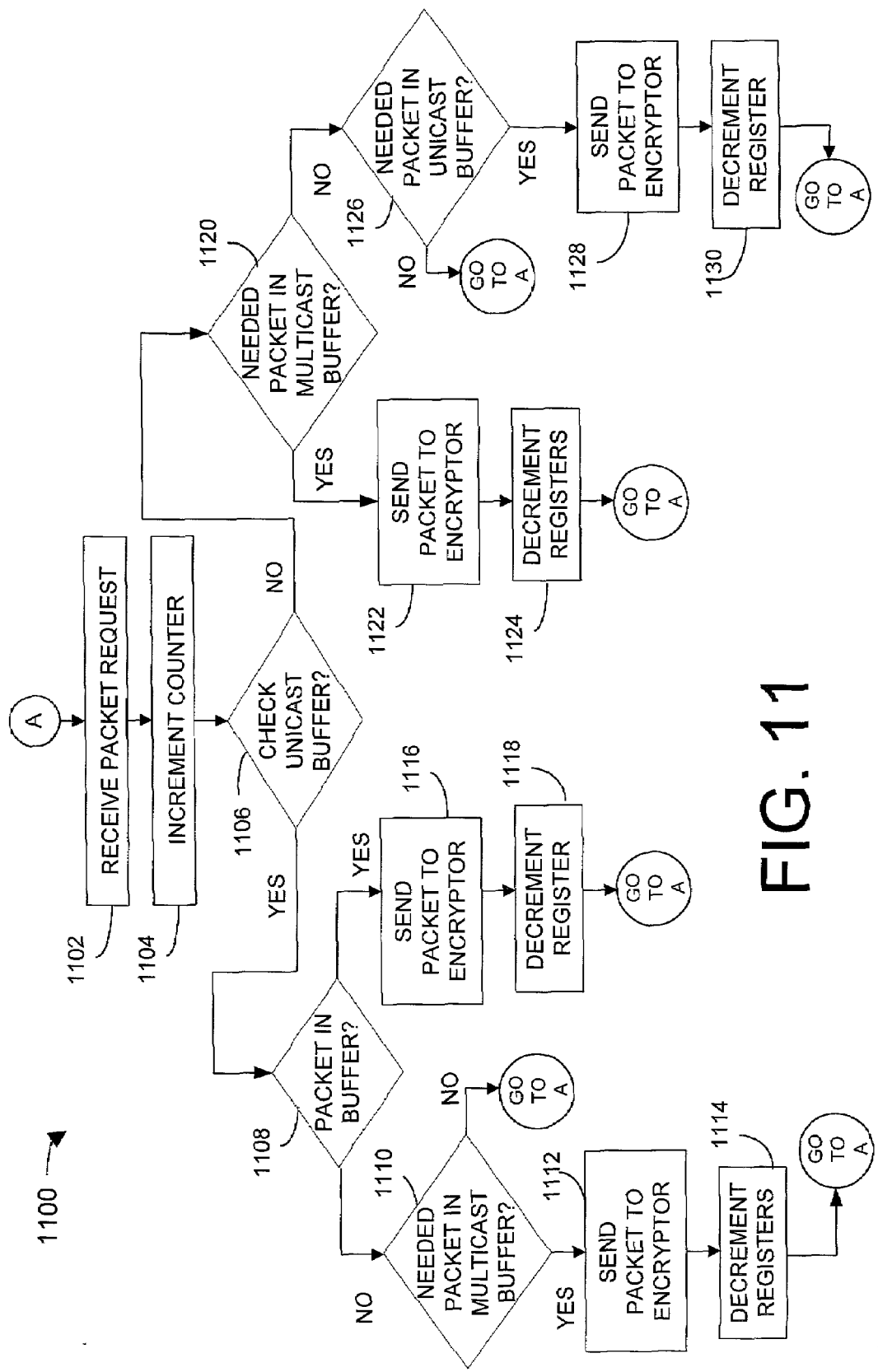
FIG. 11 is a flowchart of a method of retrieving appropriate packets from memory.

Referring to FIG. 11, in the preferred embodiment, the FPGA 706 implements the steps 1100 to retrieve packets from memory 726. In step 1102, the request counter 720 receives a packet request message from the packet requester 740. The packet request message includes information that identifies the particular output buffer 744 for which the packet has been requested, such as output buffer 744(b).

In step 1104 the request counter 720, which maintains request count registers 722 for each output buffer 744(a) through 744(d), increments the request count register 722 associated with the particular output buffer 744 identified in the packet request message. The request counter 720 then sends information to the packet handler 724 that identifies the particular output buffer associated with the request packet message and the current values of the request count register 722. For example, the message to the packet handler 724 might indicate that the output buffer 744(b) is ready for a transport stream packet 500 and that the request count registers 722 that are associated with output buffers 744(a), 744(c) and 744(d) have a value of 1 and the request count register 722 associated with the output buffer 744(b) has a value of 2. In which case, all of the output buffers 744 are ready to receive at least one transport stream packet 500.

In step 1106, the packet handler 724 determines whether to check the unicast buffer 728 associated with the particular output buffer 744 identified by the request counter 720. A non-limiting example of one method for determining to check the unicast buffer 728 includes monitoring the status of the unicast packet buffers 728 and the multicast buffer 730, and initially checking the multicast buffer 730 when it has a predetermined number of data unit packets 800 stored therein. In an embodiment, the multicast buffer 730 is checked when it has more data unit packets 800 stored therein than the particular output buffer 744. In another embodiment, the packet handler 724 determines which packet buffer to initially check based at least in part upon prior determinations. For example, if the packet handler 724 last checked the unicast packet buffer 728 associated with the particular output buffer 744 identified by the request counter 720, then the packet handler 724 initially checks the multicast buffer 730. Those skilled in the art will recognize that there are many methods by which the packet handler 724 can determine whether or not it should initially check the unicast buffer 728 associated with the particular output buffer 744 identified by the request counter 720, and all such methods are intended to be within the scope of the present invention.

In step 1108, the packet handler 724 checks for a data unit packet 800 in the particular unicast buffer 728 associated with the particular output buffer 744 identified by the request counter 720. For example, if the message indicated output buffer 744(b), then the packet hander 724 checks the unicast buffer 728(b). If there is at least one data unit packet 800 in the particular unicast buffer, then, in step 1116, the packet handler 724 sends a data unit packet 800 for processing. Processing can include sending the packet to encryptor 738 for encryption or sending the packet 800 to packet requestor 740. In the preferred embodiment, the unicast buffer 728(a)-728(d) are FIFO buffers and, therefore, the packet handler 724 sends the first-in packet to the encryptor 738.

After the data unit packet 800 has been sent, in step 1118 the request counter 720 decrements the request count register 722 that is associated with the particular output buffer 744 identified in the request packet message.

For clarity, a non-limiting example is provided hereinbelow. After output buffer 744(*b*) transmits a packet to modulator 708(*b*), the packet requester 740 determines the level of the output buffer 744(*b*). When the output buffer 744(*b*) is more than half full the packet requester 740 does not send a packet request message. On the other hand, when the output buffer 744(*b*) is one-half or less full, the packet requester 740 sends a packet request message to the request counter 720. The request packet message identifies output buffer 744(*b*) as being the particular output buffer that can receive a packet. The request counter 720 increments the request count register 722 associated with the output buffer 744(*b*) and sends a message to the packet hander 724. The message from the request counter 720 includes the current status of all request count registers 722 and identifies the output buffer 744(*b*) as being the particular output buffer that can receive a packet. The packet handler 724 determines to initially check the unicast buffer 728(*b*), which is associated with the output buffer 744(*b*). Then the packet handler 724 determines that there is a data unit packet 800 in buffer 728(*b*) and sends the first-in data unit packet 800 for processing. In response to the packet handler 724 retrieving a data unit packet 800 destined for output buffer 744(*b*) from unicast buffer 728(*b*), the request counter 720 decrements the request count register 722 associated with the output buffer 744(*b*).

Referring again to step 1108, if there is not a data unit packet 800 in the particular unicast packet buffer 728 associated with the particular output buffer 744, the packet handler 724 proceeds to step 1110 and determines if there is an appropriate data unit packet 800 in the multicast buffer 730. The packet handler 724 uses the current status of all of the request count registers 722 and the modulator identifier 804 for each data unit packet 800 stored in multicast buffer 730 to retrieve an appropriate packet. For example, if the current status of the request count register 722 indicates that output buffers 744(*a*), 744(*b*) and 744(*d*) have requested at least one transport stream packet 500 and that the current request count for output buffer 744(*c*) is zero, then the packet handler 724 searches the multicast buffer 730 for a data unit packet 800 that has a modulator identifier 804 that indicates the transport stream packet 500 included in the data unit packet 800 is to be transmitted only from modulators 708(*a*), 708(*b*) and 708(*d*). For example, referring to FIG. 7(*b*), if a packet having an input PID value of 54 were stored in the multicast buffer 730, then it would be an appropriate packet for the above example. Provided that the packet handler 724 finds an appropriate packet in multicast buffer 730, then, in step 1112, packet handler 724 sends the appropriate data unit packet 800 for processing.

In step 1114, the request counter 720 decrements each request count register 722 that corresponds to the modulator identifier 804 of the appropriate data unit packet 800. For example, if the appropriate data unit packet 800 had a modulator identifier 804 that indicated output buffers 744(*a*), 744(*b*) and 744(*d*), then the request count registers 722 associated with output buffers 744(*a*), 744(*b*) and 744(*d*) are all decremented.

Referring again to step 1106, when the packet handler 724 determines not to check the particular unicast buffer associated with the particular output buffer 744 that has requested a transport stream packet 500, the packet handler 724 checks the multicast buffer 730 for an appropriate data unit packet 800. Again an appropriate data unit packet 800 is determined from the current status of the request count register 722 and from the modulator identifier 804 for each data unit packet 800 in the multicast buffer 730.

When it is determined that an appropriate data unit packet 800 is in multicast buffer 730, then, in step 1122, packet handler 724 sends the appropriate data unit packet 800 for processing. In step 1124, the request counter 720 decrements each of the request count registers 722 associated with output buffer 744 indicated by the modulator identifier 804.

On the other hand, if there is not an appropriate data unit packet 800 in the multicast buffer 730, then the packet handler 724 proceeds to step 1126. The packet handler 724 checks for a data unit packet 800 in the particular unicast buffer 728 associated with the particular output buffer 744 identified by the request counter 720. When there is a data unit packet 800 in the particular unicast buffer 728, in step 1128, the packet handler 724 sends a data unit packet 800 to the encryptor 740 or the packet requestor 740 for processing. In step 1130, the request counter decrements the request counter register 722 associated with the particular output buffer 744 identified in the modulator identifier 804 of the sent packet 800.

Generally, the encryptor 738 receives data unit packets 800 from the packet handler 724 and encrypts the data unit packets 800 before sending them to the packet requester 740. When the encryptor 738 receives a data unit packet 800 from the packet handler 724, the encryptor 738 uses the management information 806 included in the DUH 802 to encrypt the payload portion 504 of the data unit packet 800. After the payload portion 504 of the data unit packet 800 has been encrypted, the data unit packet 800 is sent to the packet requester 740.

The packet requester 740 reads the modulator identifier 804 of the DUH 802 to determine which modulator(s) 744 is to receive the data unit packet 800. The packet requester 740 also removes the DUH 802 from data unit packet 800, thereby reverting the data unit packet 800 into a standardized transport stream packet 500 for transmission. If the packet 800 is a unicast packet the packet requester 740 puts the transport stream packet 500 in the output buffer indicated by the modulator identifier 804. However, if the modulator identifier 804 indicates more than one output buffer, then the data unit packet 800 is a multicast packet, and the packet requester 740 sends a copy of the transport stream packet 500 to each output buffer indicated in the modulator identifier 804.

It should be noted that copies of the multicast packet are produced only when the copies are to be stored in their respective output buffers 744. Thus, the FPGA 706 conserves processing power by only processing the multicast packet and then copying it, instead of copying the multicast packet and processing/encrypting each copy of the multicast packet.

Furthermore, it should be noted that the present invention includes logic for reading, making, and routing system/operational packets, such as, but not limited to, PAT, PMT, CAT, etc. packets. The logic can reside in the FPGA 706 or in the CPU 702, in hardware or software, or a combination of both. Those skilled in the art will recognize that the system/operational packets of the input transport stream 710(*a*) and 710(*b*) are usually not the same as the system/operational packets of the output transport streams 712(*a*) through 712(*d*). Generally, the system/operational packets need to be changed to reflect the remapping of the PID values of the transmitted programs, and to enable the multiplexing of the input transport stream 710(*a*) and 710(*b*).

It should also be understood that the system/operational packets are placed in their respective output buffers 744 without overflowing the output buffer. In one embodiment, system/operational packets are only added to a particular output buffer 744 when the associated request count register 722 has a value that is greater than zero, and then the associated request count register 722 is decremented when the system/operational packet is placed in the particular buffer.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed:

1. A method for providing a multicast of a packet, which is included in a transport stream, in a digital network, the method comprising:
   receiving at an input port of a multimodulator the transport stream having a plurality of packets included therein;
   determining from a table whether a given packet of the plurality of packets is a multicast packet or a unicast packet, wherein a multicast packet is designated for transmission from a plurality of modulators included in the multimodulator and a unicast packet is designated for transmission from only one modulator of the plurality of modulators, wherein each modulator of the multimodulator includes an identifier;
   appending a data unit header to each packet, the data unit header including the modulator identifier identifying one or more of the plurality of modulators from which the packet is to be transmitted;
   providing each packet to one of a multicast or unicast buffer in accordance with the data unit header, a respective unicast buffer being associated with each of the plurality of modulators of the multimodulator;
   when a particular modulator is available for transmitting, determining whether to retrieve a packet from an associated multicast or unicast buffer, each packet retrieved from the multicast buffer being copied depending on how many of the plurality of modulators from which the multicast packet is to be transmitted based on the data unit header;
   stripping the data unit header from each packet prior to transmission from the particular modulator; and
   modulating and transmitting each packet and copied packet from one of the plurality of modulators;
   wherein at least some of the appending, providing, determining and stripping is performed by the multimodulator.

2. The method of claim 1, further comprising processing each packet prior to transmission from one or more of the plurality of modulators, wherein the step of processing includes encrypting the given packet.

3. The method of claim 1, further including the steps of:
   receiving a message indicating that an output buffer associated with the particular modulator of the plurality of modulators is ready to receive a packet for transmission therefrom; and
   sending a packet from one of the multicast buffer or the unicast buffer to the output buffer associated with the particular modulator, wherein the data unit header associated with the sent packet identifies the particular modulator.

4. The method of claim 3, wherein each unicast buffer stores unicast packets that are for transmission from the given modulator associated with the unicast buffer, and the multicast buffer for storing multicast packets therein intended for transmission from two or more of the modulators.

5. The method of claim 4, prior to the step of sending, further including the step of:
   determining whether to check the unicast buffer associated with the particular modulator for a unicast packet for transmission from the particular modulator or to check the multicast buffer for a multicast packet;
   responsive to determining to check the associated unicast buffer, retrieving from the associated unicast buffer the given packet when there is a unicast packet stored therein; and
   responsive to determining to check the multicast buffer, determining whether a packet stored in the multicast buffer is for transmission from the particular modulator and retrieving the given packet from the multicast buffer when the given packet is determined to be for transmission from the particular modulator.

6. The method of claim 5, prior to the step of sending, further including the step of:
   associating a count register of a plurality of count registers with each modulator of the plurality of modulators;
   incrementing the count register associated with the particular modulator indicated by the message; and
   when a packet is retrieved, decrementing each count register associated with a modulator identified by the modulator identifier associated with the retrieved given packet.

7. The method of claim 6, wherein each unicast buffer is a first-in-first-out buffer, and when the given packet is retrieved from the given unicast buffer the given packet is the current first-in packet, and wherein when the given packet is retrieved from the multicast buffer the given packet is determined at least in part by the current status of the plurality of count registers and at least in part by the modulator identifier associated with the given packet.

8. The method of claim 5, wherein the determination for checking the multicast buffer or the associated unicast buffer is based at least in part on the current status of the multicast buffer and the associated unicast buffer.

9. The method of claim 5, wherein the determination for checking the multicast buffer or the associated unicast buffer is based at least in part on prior determinations.

10. The method of claim 1, wherein at least one modulator of the plurality of modulators is a radio frequency modulator.

11. The method of claim 10, wherein the radio frequency modulator is a quadrature amplitude modulation modulator.

12. The method of claim 1, wherein the packets of the transport stream include packets conforming to MPEG protocols, and, depending upon a management field in the data unit header, the given packet has a first PID when it is received and a second PID when it is transmitted, wherein the second PID is different from the first PID, wherein the management field includes information regarding PID remapping of the first PID to the second PID.

13. The method of claim 1, further including the steps of:
   receiving a second transport stream at a second input port, the second transport stream including a plurality of packets;
   extracting from the first and second transport streams each packet that is to be transmitted from at least one modulator of the plurality of modulators; and
   sorting extracted packets into a plurality of groups, the plurality of groups including a multicast group that includes multicast packets from the first and second transport streams and at least one unicast group that includes unicast packets from the first and second transport streams.

14. The method of claim 13, wherein the at least one unicast group is a plurality of unicast groups, each unicast group is associated with a given modulator of the plurality of modulators, and wherein the data unit header identifies the given modulator of the plurality of modulators from which the unicast group is transmitted.

15. The method of claim 14, wherein the first and second transport streams include packets that conform to MPEG protocols.

16. The method of claim 15, wherein at least one packet of the first transport stream has a first PID value associated therewith and at least one packet of the second transport stream has a second PID value associated therewith, and wherein the first PID value and the second PID value are the same value.

17. The method of claim 14, wherein when a packet conforming to MPEG protocols is received the packet has a first PID value associated therewith, and the packet has a second PID value associated therewith when the packet is transmitted and when the packet is a multicast packet.

18. The method of claim 1, wherein the multimodulator further comprises an output buffer associated with each of the plurality of modulators, the method further comprising storing each of the copied multicast packets into a respective one of the output buffers according to which of the plurality of modulators are identified in the data unit header.

19. The method of claim 1, further comprising processing each packet prior to transmission from one or more of the specified plurality of modulators, the data unit header being stripped after the processing.

20. The method of claim 19, wherein the processing further comprises encrypting a payload of the data packet based on information in the data unit header.

21. A plurality of multimodulators in a digital network that receive at least one transport stream, each of the plurality of multimodulators transmit all or a portion of the at least one transport stream, each of the plurality of multimodulators comprising:
an input port that receives the at least one transport stream, each transport stream having a plurality of packets included therein;
a processor in communication with the input port, the processor determines which packets of the at least one transport stream are multicast and unicast packets, wherein a multicast packet is a packet that is transmitted from a plurality of modulators, and a unicast packet is transmitted from only one of the plurality of modulators, the processor for appending a data unit header to each packet, wherein the data unit header associates each packet to at least one modulator for transmission;
a plurality of unicast buffers for storing unicast packets and a multicast buffer for storing multicast packets, each unicast buffer being associated with a respective modulator, each buffer for receiving a packet according to the data unit header thereof; and
the plurality of modulators in communication with the processor, each modulator requests a buffered packet, modulates and transmits the requested packet therefrom, each multicast packet being copied from the multicast buffer for transmission depending on the number of transmitting modulators identified in the data unit header thereof.

22. The plurality of multimodulators of claim 21, wherein the processor of each of the plurality of multimodulators processes a particular packet for transmission by encrypting the particular packet.

23. The plurality of multimodulators of claim 21, wherein the processor of each of the plurality of multimodulators receives a request indicating that a particular modulator of the plurality of modulators is ready to receive a packet for transmission therefrom, and responsive thereto, the processor sends a given packet from a given buffer of the plurality of buffers to the particular modulator, wherein the data unit header associated with the given packet identifies the particular modulator.

24. The plurality of multimodulators of claim 21, wherein the processor of each of the plurality of multimodulators further keeps count of packet requests from each modulator, and the processor decreases the packet request count for the particular modulator when a packet is sent to the particular modulator.

25. The plurality of multimodulators of claim 24, wherein each unicast buffer is a first-in-first-out buffer, and when a given packet is retrieved from the unicast buffer associated with the particular modulator the given packet is the current first-in packet, and wherein when a given packet is retrieved from the multicast buffer the given packet is determined at least in part by the current status of the plurality of count registers and at least in part by the modulator identifier associated with the given packet.

26. The plurality of multimodulators of claim 21, wherein a determination for checking the multicast buffer or the associated unicast buffer is made based at least in part on the current status of the multicast buffer and the associated unicast buffer.

27. The plurality of multimodulators of claim 21, wherein the determination for checking the multicast buffer or the associated unicast buffer is based at least in part on prior determinations.

28. The plurality of multimodulators of claim 21, wherein at least one modulator of the plurality of modulators is a radio frequency modulator.

29. The plurality of multimodulators of claim 28, wherein the radio frequency modulator is a quadrature amplitude modulation modulator.

30. The plurality of multimodulators of claim 21, wherein the packets of the at least one transport stream include packets conforming to MPEG protocols, and, depending upon a management field of the data unit header, the given packet has a first PID when it is received and a second PID when it is transmitted, wherein the second PID is different from the first PID, wherein the management field includes information regarding PID remapping specifying the first PID to the second PID.

31. The plurality of multimodulators of claim 21, each of the plurality of modulators further including:
a second input port in communication with the processor and the plurality of modulators, the second input port receives a second transport stream at a second input port, the second transport stream including a plurality of packets; and
wherein the processor further extracts from the first and second transport streams each packet that is to be transmitted from at least one modulator of the plurality of modulators, and the processor sorts the extracted packets into a plurality of groups, the plurality of groups including a multicast group that includes multicast packets from the first and second transport streams and at least one unicast group that includes unicast packets from the first and second transport streams.

32. The plurality of multimodulators of claim 31, wherein the at least one unicast group is a plurality of unicast groups, each unicast group is associated with a given modulator of the plurality of modulators.

33. The plurality of multimodulators of claim 32, wherein the first and second transport streams include packets that conform to MPEG protocols.

34. The plurality of multimodulators of claim 33, wherein at least one packet of the first transport stream has a first PID value associated therewith and at least one packet of the second transport stream has a second PID value associated therewith, and wherein the first PID value and the second PID value are the same value.

35. The plurality of multimodulators of claim 32, wherein when a packet conforming to MPEG protocols is received the packet has a first PID value associated therewith, and the packet has a second PID value associated therewith when the packet is transmitted and when the packet is a multicast packet.

36. A multimodulator in a broadband delivery system of digital network that receives at least one transport stream, the multimodulator comprising:
    an input port receives the at least one transport stream, each transport stream having a plurality of data packets included therein;
    a packet handler that appends a data unit header to each data packet that has been determined is to be retransmitted from the multimodulator to provide a data unit packet, the data unit header including information identifying one or more of the plurality of modulators from which the packet is to be transmitted;
    memory comprising at least one unicast buffer and a multicast buffer, the packet handler storing each data unit packet in a corresponding one of the at least one unicast buffer and the multicast buffer according to the data unit header appended thereto; and
    a plurality of modulators that request a buffered packet, modulate and transmit the requested packet therefrom, the packet handler retrieving a given data unit packet from one of the at least one unicast buffer and the multicast buffer in response to a request for a data packet, at least a payload portion of the retrieved data unit packet being stored in an output buffer associated with each of the plurality of modulators from which the packet is to be transmitted according to the information in the data unit header of the retrieved data unit packet,
    wherein, if the retrieved data unit packet is a multicast packet, at least the payload portion of the multicast packet retrieved from the multicast buffer is copied from the multicast buffer for transmission depending on the number of modulators identified in the data unit header thereof.

37. The multimodulator of claim 36, further comprising a packet requester that sends the request for a data packet for given one of the plurality of modulators that is determined to be ready to receive a data packet, the packet requestor placing at least the payload portion of the retrieved data unit packet in the output buffer indicated in the data unit header thereof.

38. The multimodulator of claim 37, wherein, if the retrieved data unit packet is a multicast packet, the packet requestor copies at least the payload portion of the retrieved data packet and stores each copy of the data packet to a respective one of the output buffers indicated in the data unit header.

39. The multimodulator of claim 37, wherein the packet requestor strips the data unit header from the data unit packet before the retrieved packet is stored in each output buffer for transmission.

40. The multimodulator of claim 36, wherein the packet handler determines whether a payload portion of the retrieved data unit packet should be encrypted prior to transmission from the multimodulator.

41. The multimodulator of claim 40, further comprising an encryptor that encrypts the payload portion of data unit packet, the encrypted data packet being sent to the output buffer indicated by the data unit header thereof.

42. The multimodulator of claim 36, further comprising a request counter that keeps count of packet requests from the packet requestor for each of the modulators, and the request counter increasing a packet request count for a particular modulator when a packet is requested for the particular modulator and decreasing the packet request count for the particular modulator when a packet is sent to the output buffer particular modulator.

43. The multimodulator of claim 42, wherein the at least one unicast buffer comprises a plurality of unicast buffers, each unicast buffer being associated with a respective one of the plurality of modulators and being a first-in-first-out buffer, and when a given packet is retrieved from the unicast buffer associated with the particular modulator the given packet is the current first-in packet, and wherein when a given packet is retrieved from the multicast buffer the given packet is determined at least in part by the current status of the request counter and at least in part by the modulator identifier associated with the given packet.

44. The multimodulator of claim 36, wherein at least one modulator of the plurality of modulators is a radio frequency modulator.

45. The multimodulator of claim 44, wherein the radio frequency modulator is a quadrature amplitude modulation modulator.

46. The multimodulator of claim 36, wherein the packets of the at least one transport stream include packets conforming to MPEG protocols, and, depending upon a management field of the data unit header, the given packet has a first PID when it is received and a second PID when it is transmitted, wherein the second PID is different from the first PID, wherein the management field includes information regarding PID remapping specifying the first PID to the second PID.

47. The multimodulator of claim 36, further comprising:
    a second input port in communication with the processor and the plurality of modulators, the second input port receives a second transport stream at a second input port, the second transport stream including a plurality of packets; and
    wherein the each packet that is to be transmitted from at least one modulator of the plurality of modulators is extracted from the transport stream and sorted into a plurality of groups of extracted packets, the plurality of groups including a multicast group that includes multicast packets from the first and second transport streams and at least one unicast group that includes unicast packets from the first and second transport streams.

48. The multimodulator of claim 47, wherein the at least one unicast group is a plurality of unicast groups, each unicast group being associated with a given modulator of the plurality of modulators.

49. The multimodulator of claim 48, wherein the first and second transport streams include packets that conform to MPEG protocols.

50. The multimodulator of claim 49, wherein at least one packet of the first transport stream has a first PID value associated therewith and at least one packet of the second transport stream has a second PID value associated therewith, and wherein the first PID value and the second PID value are the same value.

51. The multimodulator of claim 48, wherein when a packet conforming to MPEG protocols is received the packet has a first PID value associated therewith, and the packet has a second PID value associated therewith when the packet is transmitted as a multicast packet.

* * * * *

UNITED STATES PATENT AND TRADEMARK OFFICE
CERTIFICATE OF CORRECTION

PATENT NO. : 7,627,887 B2  Page 1 of 1
APPLICATION NO. : 09/845510
DATED : December 1, 2009
INVENTOR(S) : Bisher, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1819 days.

Signed and Sealed this

Twenty-first Day of December, 2010

David J. Kappos
*Director of the United States Patent and Trademark Office*